US012083708B2

(12) United States Patent
Hara et al.

(10) Patent No.: US 12,083,708 B2
(45) Date of Patent: Sep. 10, 2024

(54) PELLET OF LIQUID CRYSTAL POLYESTER RESIN COMPOSITION

(71) Applicant: SUMITOMO CHEMICAL COMPANY, LIMITED, Tokyo (JP)

(72) Inventors: Tomoyuki Hara, Tokyo (JP); Masanobu Uonami, Niihama (JP); Takayuki Sugiyama, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 394 days.

(21) Appl. No.: 17/610,047

(22) PCT Filed: May 15, 2020

(86) PCT No.: PCT/JP2020/019442
§ 371 (c)(1),
(2) Date: Nov. 9, 2021

(87) PCT Pub. No.: WO2020/235479
PCT Pub. Date: Nov. 26, 2020

(65) Prior Publication Data
US 2022/0266476 A1 Aug. 25, 2022

(30) Foreign Application Priority Data

May 17, 2019 (JP) .................................. 2019-093681
Dec. 20, 2019 (JP) .................................. 2019-230639
May 12, 2020 (JP) .................................. 2020-083786

(51) Int. Cl.
B29B 9/06 (2006.01)
B29B 9/14 (2006.01)
(Continued)

(52) U.S. Cl.
CPC .................. *B29B 9/06* (2013.01); *B29B 9/14* (2013.01); *B29C 48/022* (2019.02); *B29C 48/40* (2019.02);
(Continued)

(58) Field of Classification Search
None
See application file for complete search history.

(56) References Cited

U.S. PATENT DOCUMENTS 7,304,121 B2 12/2007 Kato et al.
2003/0089887 A1 5/2003 Okamoto et al.
(Continued)

FOREIGN PATENT DOCUMENTS

CN 105074517 A 11/2015
CN 105273366 A 1/2016
(Continued)

OTHER PUBLICATIONS

Machine translation JP-08192421-A (Year: 2023).*
(Continued)

*Primary Examiner* — Alexandre F Ferre
(74) *Attorney, Agent, or Firm* — Rimon P.C.

(57) ABSTRACT

The present invention relates to a pellet of a liquid crystal polyester resin composition containing a liquid crystal polyester resin and an inorganic filler, said pellet being characterized in that if the horizontal Feret's diameter of a rectangle circumscribed about a projected image of the front of the pellet is taken as the length of the long side of the rectangle and the vertical Feret's length is taken as the length of the short side of the rectangle, the length of the long side of the rectangle is from 3 mm to 4 mm (inclusive) and the area ratio of the area S of the projected image to the area S0 of the rectangle, namely S/S0 is from 0.55 to 0.70 (inclusive).

5 Claims, 3 Drawing Sheets

(51) Int. Cl.

| | |
|---|---|
| *B29C 48/00* | (2019.01) |
| *B29C 48/40* | (2019.01) |
| *C08G 63/183* | (2006.01) |
| *C08K 3/34* | (2006.01) |
| *C08K 7/14* | (2006.01) |
| *B29K 67/00* | (2006.01) |
| *B29K 509/08* | (2006.01) |
| *B29K 509/10* | (2006.01) |

(52) U.S. Cl.
CPC .............. *C08G 63/183* (2013.01); *C08K 3/34* (2013.01); *C08K 7/14* (2013.01); *B29K 2067/00* (2013.01); *B29K 2509/08* (2013.01); *B29K 2509/10* (2013.01)

(56) References Cited

U.S. PATENT DOCUMENTS

| | | |
|---|---|---|
| 2010/0271268 A1 | 10/2010 | Hosoda et al. |
| 2011/0114883 A1 | 5/2011 | Murouchi et al. |
| 2011/0189455 A1 | 8/2011 | Fukuhara et al. |
| 2012/0025421 A1 | 2/2012 | Fukuhara et al. |
| 2012/0153224 A1 | 6/2012 | Yonezawa et al. |
| 2012/0253060 A1 | 10/2012 | Ohtomo et al. |
| 2015/0353827 A1 | 12/2015 | Hegi |
| 2016/0195654 A1 | 7/2016 | Suzaki et al. |
| 2017/0129076 A1 | 5/2017 | Gonzales et al. |
| 2017/0144353 A1 | 5/2017 | Miyauchi et al. |
| 2018/0346642 A1 | 12/2018 | Hegi |

FOREIGN PATENT DOCUMENTS

| | | | |
|---|---|---|---|
| EP | 0 359 490 A2 | | 3/1990 |
| EP | 3 738 737 A1 | | 11/2020 |
| EP | 3 738 996 A1 | | 11/2020 |
| EP | 4 011 942 A1 | | 6/2022 |
| EP | 4 011 975 A1 | | 6/2022 |
| JP | 02-075653 A | | 3/1990 |
| JP | 06-032880 A | | 2/1994 |
| JP | 08192421 A | * | 7/1996 |
| JP | 10-139885 A | | 5/1998 |
| JP | 10182839 A | * | 7/1998 |
| JP | 11-048278 A | | 2/1999 |
| JP | 11-309715 A | | 11/1999 |
| JP | 2002-018841 A | | 1/2002 |
| JP | 2002-138187 A | | 5/2002 |
| JP | 2003-096279 A | | 4/2003 |
| JP | 2003-211443 A | | 7/2003 |
| JP | 2004-114431 A | | 4/2004 |
| JP | 2004-196886 A | | 7/2004 |
| JP | 2008-101962 A | | 5/2008 |
| JP | 2008-133416 A | | 6/2008 |
| JP | 2008-248095 A | | 10/2008 |
| JP | 2009-074043 A | | 4/2009 |
| JP | 2010-138228 A | | 6/2010 |
| JP | 2011-157421 A | | 8/2011 |
| JP | 2012-046742 A | | 3/2012 |
| JP | 2012-072370 A | | 4/2012 |
| JP | 2012-126842 A | | 7/2012 |
| JP | 2017-137438 A | | 8/2017 |
| JP | 6175720 B1 | | 8/2017 |
| JP | 2018-178098 A | | 11/2018 |
| TW | 201249925 A | | 12/2012 |
| TW | 201643219 A | | 12/2016 |
| WO | 2014/157438 A1 | | 10/2014 |

OTHER PUBLICATIONS

Machine translation JP-10182839-A (Year: 2023).*
Extended European Search Report issued in corresponding European Patent Application No. 20810355.6-1014, dated Jan. 2, 2023.
Chinese Office Action issued in corresponding Chinese Patent Application No. 202080035747.4, dated Feb. 1, 2023, with English translation.
Office Action received in Corresponding Indian Patent Application No. 202147051258, dated Nov. 30, 2023.
International Search Report issued in corresponding International Patent Application No. PCT/JP2020/019442, dated Jul. 21, 2020, with English translation.
Japanese Notice of Reasons for Rejection issued in corresponding Japanese Patent Application No. 2019-093681, Jul. 2, 2019, with English translation.
Japanese Notice of Reasons for Rejection issued in corresponding Japanese Patent Application No. 2019-230639, dated Feb. 12, 2020, with English translation.

* cited by examiner

PELLET OF LIQUID CRYSTAL POLYESTER RESIN COMPOSITION

CROSS REFERENCE TO RELATED APPLICATIONS

This application is the U.S. National Phase under 35 U.S.C. § 371 of International Application No. PCT/JP2020/019442, filed on May 15, 2020, which claims the benefit of Japanese Application No. 2019-93681, filed on May 17, 2019, Japanese Application No. 2019-230639, filed Dec. 20, 2019 and Japanese Application No. 2020-83786, filed on May 12, 2020, the entire contents of each are hereby incorporated by reference.

TECHNICAL FIELD

The present invention relates to a pellet of a liquid crystal polyester resin composition.

BACKGROUND OF THE INVENTION

A liquid crystal polyester resin is generally referred to as a melt liquid crystal type (thermotropic liquid crystal) polymer. The liquid crystal polyester resin has extremely excellent melt fluidity due to the specific behavior thereof, and exhibits a heat distortion resistance at 300° C. or more depending on the structure thereof.

The liquid crystal polyester resin is used to form a molded article utilized as an electronic component, an automotive component, an OA component, heat-resistant tableware, or the like, by taking advantage of the high fluidity and high heat resistance thereof.

In recent years, the reduction in the size and thickness of electronic devices has progressed. In particular, there has been a remarkable tendency in which the size and thickness of electronic components such as connectors have been reduced, and the use of liquid crystal polyester resins is expanding.

In the case where such a molded article is prepared, a liquid crystal polyester resin or a pellet of a liquid crystal polyester resin composition is used as a molding material. A liquid crystal polymer pellet having a pellet length of 1.0 mm to 5.0 mm, an elliptical shape in the cross section thereof, the major axis thereof being 2.0 mm to 8.0 mm, and the ratio of the major axis to the minor axis (major axis/minor axis) being 1.0 to 4.0, is disclosed in Patent Document 1.

A liquid crystal resin pellet satisfying the following formulae:

$1 \text{ mm} \leq M \leq 2 \text{ mm}$, $1 \text{ mm} \leq T \leq 2.5 \text{ mm}$, $1 \text{ mm} \leq Z \leq 2.5 \text{ mm}$, and, $M\sigma \leq 0.15$, $(M+T+Z) \leq 7 \text{ mm}$, $(M-Z) \leq 0.5 \text{ mm}$, $(T-M) \leq -0.1 \text{ mm}$, wherein M is the average length in a direction vertical to the cross section of the pellet, T is the average length of the longest axis (major axis) in the cross section of the pellet, Z is the average length of the shortest axis (minor axis) therein, and $M\sigma$ is the standard deviation of the average length M in a direction vertical to the cross section of the pellet, is disclosed in Patent Document 2.

DOCUMENTS OF RELATED ART

Patent Documents

Patent Document 1: Japanese Unexamined Patent Application Publication No. Hei 8-192421

Patent Document: 2 Japanese Unexamined Patent Application Publication No. Hei 11-309715

SUMMARY OF THE INVENTION

Problems to be Solved by the Invention

However, there is a case in which such a type of pellet is chipped due to friction caused between pellets during transport or use thereof, thereby generating fine powders. In addition, there is a case in which the orientation unique to the liquid crystal polyester resin causes cracking of the pellet along the orientation direction of the liquid crystal polyester resin. Such cracking of the pellet may cause further generation of fine powders from the pellet.

It is considered that the generation of fine powders from the pellet tends to cause problems, such as clogging or variation in the supply amount, at a pellet feedstock inlet in an extruder, a molding machine, or the like, when the feedstocks are put thereinto. Thus, it is required that the generation of fine powders caused by cracking of the pellet be suppressed.

The present invention has been made in view of such circumstances, with an object of providing a pellet of a liquid crystal polyester resin composition in which the generation of fine powders caused by cracking of the pellet is suppressed.

Means to Solve the Problems

In order to solve the above-mentioned problems, an aspect of the present invention provides a pellet of a liquid crystal polyester resin composition containing: a liquid crystal polyester resin; and an inorganic filler, wherein the horizontal Feret length in a rectangle circumscribed around a front projected image of the pellet is taken as the length of the long side of the rectangle, the vertical Feret length is taken as the length of the short side of the rectangle, the length of the long side of the rectangle is 3 mm to 4 mm, and the area ratio S/S of the area S of the projected image to the area S0 of the rectangle is 0.55 to 0.70.

In an aspect of the present invention, when the direction of the length of the short side of the rectangle is defined as the radial direction of the pellet, the pellet may have a structure in which the cross-section in the radial direction has an elliptical shape in which the length ratio D1/D2 of the major axis D1 to the minor axis D2 is more than 1.0 and 2.5 or less.

In an aspect of the present invention, the inorganic filler may be at least one selected from the group consisting of chopped glass fiber, milled glass fiber, talc and mica.

In an aspect of the present invention, the inorganic filler may be mica, and the amount of the mica, relative to 100 parts by mass of the liquid crystal polyester resin, may be more than 20% by mass and 80% by mass or less.

Effects of the Invention

A pellet of a liquid crystal polyester resin composition in which the generation of fine powders caused by cracking of pellet is suppressed is provided according to one aspect of the present invention.

EMBODIMENTS FOR CARRYING OUT THE INVENTION

<Pellet of Liquid Crystal Polyester Resin Composition>

Figure 1:
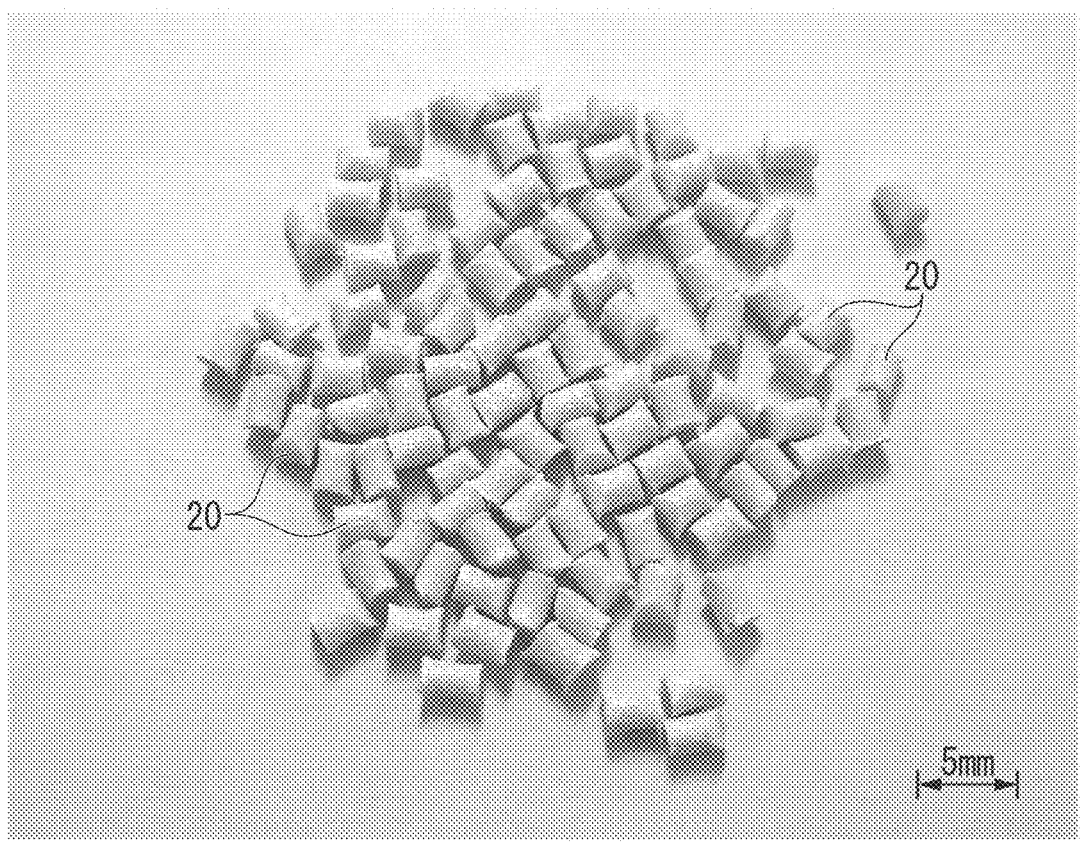
FIG. 1 is a photograph indicating one embodiment of a pellet of a liquid crystal polyester resin composition.

FIG. 1 shows an embodiment of a pellet of a liquid crystal polyester resin composition and is a photograph of plural pellets 20 placed on a flat plate, the photograph being taken from above the pellets 20.

The pellet 20 according to the present embodiment is a pellet of a liquid crystal polyester resin composition containing: a liquid crystal polyester resin; and an inorganic filler. Hereinafter, the pellet may be simply referred to as "pellet". The pellet 20 according to the present embodiment is a molding material available to prepare a molded article.

In the present specification, the term "liquid crystal polyester resin composition" means a material obtained by melt-kneading a liquid crystal polyester resin and an inorganic filler.

The shape of the pellet according to the present embodiment is a cylindrical shape. The pellet according to the present embodiment is obtained by, for example, pelletizing a liquid crystal polyester resin composition by conducting cutting while taking up a strand formed by extrusion of the liquid crystal polyester resin composition, as described below. Since the strand is thus pelletized while applying an external force thereto, the shape of the cross-section vertical to the axial direction of the pellet according to the present embodiment is an elliptical shape.

In the present specification, the term "elliptical shape" encompasses the shape of a curve defined as a locus of points which maintain a uniform sum of distances from two constant points, as well as elliptical shapes close to the curve defined above.

In the pellet according to the present embodiment, the length of the pellet, the major axis D1 and the minor axis D2 in the cross-section of the pellet, the area S of the projected image of the pellet and the area S0 of the rectangle circumscribed around the projected image are determined by the following procedures.

The pellet according to the present embodiment is recorded using a device manufactured by KEYENCE CORPORATION under the trade name of "VR-3200 one-shot 3D shape measurement device", and each size of the pellet is determined by conducting analysis based on the resultant image.

Specifically, at least 100 pellets are placed on a flat plate. At the time, each pellet is placed by arranging the axial direction of all of the pellets in one direction parallel to the plane direction of the flat plate on which the pellets are placed, in view of the restriction on the measurement by the device. Furthermore, the pellets are placed such that the pellets having a cylindrical shape take the most stable position in a field of view from the axial direction of the pellets. The term "the most stable position" means the position in which the center of gravity of the bottom surface of the pellet vertical to the axial direction observed in the above-mentioned field of view becomes the lowest. Namely, in the case where the shape of the bottom surface is an elliptical shape, the elliptical long axis is parallel to the plane direction of the flat plate on which the pellets are placed.

A projected image (front projected image) of each arranged pellet is recorded from above the direction vertical to the plane direction of the flat plate on which the pellets are placed using the above-mentioned device in accordance with the usual method of using the device.

The vertical Feret length and the horizontal Feret length of each pellet are measured using the recorded front projected image of the pellet. Specifically, the analysis is conducted per pellet using an attached analysis software, and a rectangle circumscribed around the resultant projected image is set, the length of the long side of the rectangle is taken as the horizontal Feret length, and the length of the short side of the rectangle is taken as the vertical Feret length. The length direction of the short side of the rectangle is defined as the radial direction of the pellet.

The rectangle circumscribed around the front projected image of the pellet is set such that a portion of the front projected image is inscribed to all of four sides of the rectangle, and the area of the rectangle is minimized.

In the pellet according to the present embodiment, the length of the long side of the rectangle (horizontal Feret length) is taken as the length of the pellet.

The length of the short side of the rectangle (vertical Feret length) is defined as the major axis D1 of the cross-section of the pellet. The maximum height in the cross-section of the pellet is defined as the minor axis D2 of the cross-section of the pellet. The term "maximum height" means the maximum value of the height from the flat plate. The average of the maximum height of the cross-section of the pellet is defined as the average height of the pellet.

The product of the vertical Feret length and the horizontal Feret length is defined as the area S0 of the rectangle circumscribed around the front projected image of the pellet. The actual cross-sectional area of the cross-section at a half height of the average height of the pellets, the cross-section being horizontal to the plane direction of the flat plate in which the pellets are placed, is calculated using the attached analysis software, and the thus obtained cross-sectional area is defined as the area S of the projected image of the pellet.

<<Length of Pellet>>

The length of the pellet according to the present embodiment is substantially 3 mm to 4 mm.

The amount of the pellets having a length of 3 mm to 4 mm in the pellets according to the present embodiment, relative to the total number of the pellets (the total number of measured pellets), is 90% or more, preferably 95% or more, even more preferably 98% or more, and may be 100%.

In the case where the length of the pellet according to the present embodiment is within the above-mentioned range, clogging rarely occurs when the pellet is supplied to an extruder and a molding machine, and stable weighing can be realized. Thus, the quality of a molded article tends to become stable.

The length of the pellet is 3.0 mm to 4.0 mm, preferably 3.0 mm to 3.8 mm, and more preferably 3.1 mm to 3.5 mm.

The length of the pellet may be adjusted by the speed of a rotary blade of a pelletizer.

In the pellet according to the present embodiment, the phrase "the length of the pellet is 3.0 mm to 4.0 mm" means that the average of values obtained by measuring the length of all of the pellets is 3.0 mm to 4.0 mm.

<<Area Ratio S/S0>>

In the pellet according to the present embodiment, the smaller the area ratio S/S0 of the area S of the projected image to the area S0 of the rectangle circumscribed around the projected image, the more distorted the shape of the pellet.

In the case where the area ratio S/S0 is extremely low, fine powders tend to be generated due to friction between the pellets. Therefore, it is preferable that the area ratio S/S0 be close to 1. However, in the case where the area ratio S/S0 is extremely close to 1, the pellet is easily cracked along the orientation direction of the liquid crystal polyester resin. It is considered that the liquid crystal polyester resin is easily orientated, thereby aligning the orientation direction of the resin with the axial direction of the pellet, and therefore cracking easily occurs.

In view of the above, the area ratio S/S0 of the projected image of the pellet according to the present embodiment is 0.55 to 0.70.

In the pellet according to the present embodiment, the phrase "the area ratio S/S0 is 0.55 to 0.70" means that the average of values obtained by measuring the area ratio S/S0 of all of the pellets is 0.55 to 0.70.

In the case where the area ratio S/S0 of the projected image of the pellet according to the present embodiment is 0.55 or more, fine powders due to friction between pellets rarely occur. In the case where the area ratio S/S0 of the projected image of the pellet according to the present embodiment is 0.70 or less, it is considered that it is difficult to orientate the liquid crystal polyester resin in the pellet, and therefore it is difficult for the pellet to crack along the orientation direction of the liquid crystal polyester resin.

The area ratio S/S0 of the projected image of the pellet according to the present embodiment is 0.55 to 0.70, and preferably 0.58 to 0.67.

<<Length Ratio D1/D2>>

The cross-section vertical to the axial direction of the pellet according to the present embodiment, that is, the cross-section of the pellet in a radial direction, has an elliptical shape.

In the pellet according to the present embodiment, the closer to 1 the length ratio D1/D2 of the major axis D1 to the minor axis D2 in the cross-section of the pellet becomes, the closer to an exact circle the cross-section in a radial direction of the pellet becomes.

The length ratio D1/D2 of the pellet of the liquid crystal polyester resin composition according to the present embodiment is preferably more than 1.0 and 2.5 or less, more preferably 1.6 to 2.5, and even more preferably 1.7 to 2.3.

The ratio D1/D2 may be adjusted by the pressure of take-up rolls.

In the pellet according to the present embodiment, the phrase "the length ratio D1/D2 is more than 1.0 and 2.5 or less" means that the average of values obtained by measuring the length ratio D1/D2 of all of the pellets is more than 1.0 and 2.5 or less.

In the case where the length ratio D1/D2 is 2.5 or less, it is difficult for clogging of the pellet, referred to as bridge, to occur when the pellet is supplied to an extruder or a molding machine. In addition, the more the length ratio D1/D2 exceeds 1.0, the more difficult it is for clogging of the pellet to occur when the pellet is weighed by an extruder or a molding machine, thereby easily decreasing the pressure during weighing. Therefore, the pellet can be stably weighed by an extruder or a molding machine.

[Liquid Crystal Polyester Resin]

Typical examples of the liquid crystal polyester resin available in the present embodiment include: polymers obtained by condensing and polymerizing (polycondensing) an aromatic hydroxycarboxylic acid, an aromatic dicarboxylic acid, and at least one compound selected from the group consisting of aromatic diols, aromatic hydroxylamines and aromatic diamines; polymers obtained by polymerizing a plurality of types of aromatic hydroxycarboxylic acids; polymers obtained by polymerizing an aromatic dicarboxylic acid and at least one compound selected from the group consisting of aromatic diols, aromatic hydroxylamines and aromatic diamines; and polymers obtained by polymerizing an aromatic hydroxycarboxylic acid and a polyester such as polyethylene terephthalate.

Among them, polymers obtained by condensing and polymerizing (polycondensing) an aromatic hydroxycarboxylic acid, an aromatic dicarboxylic acid, and at least one compound selected from the group consisting of aromatic diols, aromatic hydroxylamines and aromatic diamines are preferable.

The aromatic hydroxycarboxylic acid, the aromatic dicarboxylic acid, the aromatic diol, the aromatic hydroxylamine and the aromatic diamine may be each independently replaced partially or entirely with a polymerizable ester-forming derivative thereof.

Examples of the polymerizable derivative of a compound having a carboxy group, such as an aromatic hydroxycarboxylic acid and an aromatic dicarboxylic acid, include esters, acid halides and acid anhydride. Examples of the esters include compounds obtained by converting a carboxy group into an alkoxycarbonyl group or an aryloxycarbonyl group. Examples of the acid halides include compounds obtained by converting a carboxy group into a haloformyl group. Examples of the acid anhydrides include compounds obtained by converting a carboxy group into an acyloxycarbonyl group.

Examples of the polymerizable derivative of a compound having an amino group, such as an aromatic hydroxylamine and an aromatic diamine, include compounds (acylated compounds) obtained by acylating an amino group to convert the amino group into an acylamino group.

Among the exemplified polymerizable derivatives, acylated compounds obtained by acylating aromatic hydroxycarboxylic acids and aromatic diols are preferable as feedstock monomers of the liquid crystal polyester resin.

It is preferable that the liquid crystal polyester resin available in the present embodiment have a repeating unit of the following formula (1) (hereinafter, may be referred to as "repeating unit (1)"). In addition, it is more preferable that the liquid crystal polyester resin have the repeating unit (1), a repeating unit of the following formula (2) (hereinafter, may be referred to as "repeating unit (2)"), and a repeating unit of the following formula (3) (hereinafter, may be referred to as "repeating unit (3)").

—O—Ar$^1$—CO— (1)

—CO—Ar$^2$—CO— (2)

—X—Ar$^3$—Y— (3)

(in the formulae (1) to (3). Ar$^1$ represents a phenylene group, a naphthylene group or a biphenylene group. Ar$^2$ and Ar$^3$ each independently represents a phenylene group, a naphthylene group, a biphenylene group or a group of the following formula (4). X and Y each independently represents an oxygen atom or an imino group (—NH—). At least one hydrogen atom in the aforementioned group Ar$^1$, Ar$^2$ or Ar³ may be each independently substituted with a halogen atom, a C1-10 alkyl group or a C6-20 aryl group.)

—Ar⁴—Z—Ar⁵—    (4)

(In the formula (4), Ar⁴ and Ar⁵ are each independently a phenylene group or a naphthylene group. Z is an oxygen atom, a sulfur atom, a carbonyl group, a sulfonyl group or a C1-10 alkylidene group. At least one hydrogen atom in the aforementioned group Ar⁴ or Ar⁵ may be each independently substituted with a halogen atom, a C1-10 alkyl group or a C6-20 aryl group.)

Examples of the halogen atom substitutable with a hydrogen atom include a fluorine atom, a chlorine atom, a bromine atom and an iodine atom.

Examples of the C1-10 alkyl group substitutable with a hydrogen atom include a methyl group, an ethyl group, a 1-propyl group, an isopropyl group, a 1-butyl group, an isobutyl group, a sec-butyl group, a tert-butyl group, a 1-hexyl group, a 2-ethylhexyl group, a 1-octyl group and a 1-decyl group.

Examples of the C6-20 aryl group substitutable with a hydrogen atom include: monocyclic aromatic groups, such as a phenyl group, an o-tolyl group, a m-tolyl group, and a p-tolyl group; and condensed aromatic groups such as a 1-naphthyl group and a 2-naphthyl group.

In the case where at least one hydrogen atom is substituted with the aforementioned substituent in the aforementioned group Ar¹, Ar², Ar³, Ar⁴ or Ar⁵, the number of the substituent is each independently 1 or 2. The number of the substituent in each group Ar¹, Ar², Ar³, Ar⁴ or Ar⁵ is preferably 1.

Examples of the C1-10 alkylidene group include a methylene group, an ethylidene group, an isopropylidene group, a 1-butylidene group and a 2-ethylhexylidene group.

The repeating unit (1) is a repeating unit derived from a predetermined aromatic hydroxycarboxylic acid.

In the present specification, the term "derived from" means that the chemical structure is changed by polymerization of feedstock monomers, but other structural changes do not occur.

Examples of the aromatic hydroxycarboxylic acid include 4-hydroxybenzoic acid, meta-hydroxybenzoic acid, 2-hydroxy-6-naphthoic acid, 2-hydroxy-3-naphthoic acid, 1-hydroxy-5-naphthoic acid, 4-hydroxy-4'-carboxyldiphenyl ether, and aromatic hydroxycarboxylic acids obtained by substituting some of the hydrogen atoms of aromatic rings of the above-mentioned aromatic hydroxycarboxylic acids with substituents selected from the group consisting of alkyl groups, aryl groups and halogen atoms.

One of the aromatic hydroxycarboxylic acids may be used alone or at least two thereof may be used together so as to prepare the liquid crystal polyester resin.

As the repeating unit (1), a unit in which Ar¹ is a 1,4-phenylene group (repeating unit derived from 4-hydroxybenzoic acid) and a unit in which Ar¹ is a 2,6-naphthylene group (repeating unit derived from 6-hydroxy-2-naphthoic acid) are preferable, and the unit in which Ar¹ is a 1,4-phenylene group is more preferable.

The repeating unit (2) is a repeating unit derived from a predetermined aromatic dicarboxylic acid.

Examples of the aromatic dicarboxylic acid include terephthalic acid, isophthalic acid, biphenyl-4,4'-dicarboxylic acid, 2,6-naphthalene dicarboxylic acid, diphenyl ether-4,4'-dicarboxylic acid, diphenyl thioether-4,4'-dicarboxylic acid, and aromatic dicarboxylic acids obtained by substituting some of the hydrogen atoms of aromatic rings of the above-mentioned aromatic dicarboxylic acids with (a) substituent(s) selected from the group consisting of alkyl groups, aryl groups and halogen atoms.

One of the above-mentioned aromatic dicarboxylic acids may be used alone or at least two thereof may be used together so as to prepare the liquid crystal polyester resin.

As the repeating unit (2), a unit in which Ar² is a 1,4-phenylene group (such as a repeating unit derived from terephthalic acid), a unit in which Ar² is a 1,3-phenylene group (such as a repeating unit derived from isophthalic acid), a unit in which Ar² is a 2,6-naphthylene group (such as a repeating unit derived from 2,6-naphthalene dicarboxylic acid), and a unit in which Ar² is a diphenyl ether-4,4'-diyl group (such as a repeating unit derived from diphenyl ether-4,4'-dicarboxylic acid) are preferable, and the unit in which Ar² is a 1,4-phenylene group and the unit in which Ar² is a 1,3-phenylene group are more preferable.

The repeating unit (3) is a repeating unit derived from a predetermined aromatic diol, aromatic hydroxylamine, or aromatic diamine.

Examples of the aromatic diol, aromatic hydroxylamine or aromatic diamine include 4,4'-dihydroxybiphenyl, hydroquinone, resorcinol, 4,4'-dihydroxydiphenylketone, 4,4'-dihydroxydiphenyl ether, bis(4-hydroxyphenyl)methane, 1,2-bis(4-hydroxyphenyl)ethane, 4,4'-dihydroxydiphenyl sulfone, 4,4'-dihydroxydiphenyl thioether, 2,6-dihydroxynaphthalene, 1,5-dihydroxynaphthalene, 4-aminophenol, 1,4-phenylenediamine, 4-amino-4'-hydroxybiphenyl, and 4,4'-diaminobiphenyl.

One of the above-mentioned aromatic diols, aromatic hydroxylamines and aromatic diamines may be used alone, or at least two thereof may be used together so as to prepare the liquid crystal polyester resin.

As the repeating unit (3), a unit in which Ar³ is a 1,4-phenylene group (such as a repeating unit derived from hydroquinone, 4-aminophenol or 1,4-phenylenediamine) and a unit in which Ar³ is a 4,4'-biphenylene group (such as a repeating unit derived from 4,4'-dihydroxybiphenyl, 4-amino-4'-hydroxybiphenyl or 4,4'-diaminobiphenyl) are preferable, and the unit in which Ar³ is a 4,4'-biphenylene group is more preferable.

As the repeating unit (3), a unit in which both X and Y are oxygen atoms is preferable.

In the case where a molded article obtained from the liquid crystal polyester resin composition according to the present embodiment is required to exhibit particularly favorable heat resistance or thermal stability, it is preferable that the number of substituents in the repeating unit (1) to (3) be low. In the case where a molded article obtained from the liquid crystal polyester resin composition according to the present embodiment is required to exhibit particularly favorable heat resistance or thermal stability, it is preferable that no substituent which is weak against heat (such as an alkyl group) be present.

The heat resistance of the molded article according to the present embodiment is a property in which it is difficult for a resin constituting the molded article to be softened under a high temperature atmosphere. The heat resistance of the molded article may be confirmed by measuring the deflection temperature of the resin under load in the present embodiment. The deflection temperature under load is measured in accordance with ASTM D648 under a load of 1.82 MPa in the present embodiment. It is understood that the higher the thus measured deflection temperature of the resin under load, the higher the heat resistance of the molded article.

In addition, the thermal stability of the molded article is a property in which the resin is hardly decomposed or deteriorated when the molded article is stored at the temperature at which the resin is molded (melt temperature) in the present embodiment.

Next, the combination of structural units of the liquid crystal polyester resin particularly favorable to be applied in the present embodiment will be explained based on the exemplification of the above-mentioned structural units.

Specific examples of the liquid crystal polyester resin preferably available in the present embodiment include resins composed of constitution units (repeating units) derived from the following monomers.

(a) 4-hydroxybenzoic acid/2-hydroxy-6-naphthoic acid copolymer.
(b) 4-hydroxybenzoic acid/terephthalic acid/4,4'-dihydroxybiphenyl copolymer.
(c) 4-hydroxybenzoic acid/terephthalic acid/isophthalic acid/4,4'-dihydroxybiphenyl copolymer.
(d) 4-hydroxybenzoic acid/terephthalic acid/isophthalic acid/4,4'-dihydroxybiphenyl/hydroquinone copolymer.
(e) 4-hydroxybenzoic acid/terephthalic acid/hydroquinone copolymer.
(f) 2-hydroxy-6-naphthoic acid/terephthalic acid/hydroquinone copolymer.
(g) 4-hydroxybenzoic acid/2-hydroxy-6-naphthoic acid/terephthalic acid/4,4'-dihydroxybiphenyl copolymer.
(h) 2-hydroxy-6-naphthoic acid/terephthalic acid/4,4'-dihydroxybiphenyl copolymer.
(i) 4-hydroxybenzoic acid/2-hydroxy-6-naphthoic acid/terephthalic acid/hydroquinone copolymer.
(j) 4-hydroxybenzoic acid/2-hydroxy-6-naphthoic acid/terephthalic acid/hydroquinone/4,4'-dihydroxybiphenyl copolymer.
(k) 4-hydroxybenzoic acid/2,6-naphthalene dicarboxylic acid/4,4'-dihydroxybiphenyl copolymer.
(l) 4-hydroxybenzoic acid/terephthalic acid/2,6-naphthalene dicarboxylic acid/hydroquinone copolymer.
(m) 4-hydroxybenzoic acid/2,6-naphthalene dicarboxylic acid/hydroquinone copolymer.
(n) 4-hydroxybenzoic acid/2-hydroxy-6-naphthoic acid/2,6-naphthalene dicarboxylic acid/hydroquinone copolymer.
(o) 4-hydroxybenzoic acid/terephthalic acid/2,6-naphthalene dicarboxylic acid/hydroquinone/4,4'-dihydroxybiphenyl copolymer.
(p) 4-hydroxybenzoic acid/terephthalic acid/4-aminophenol copolymer.
(q) 2-hydroxy-6-naphthoic acid/terephthalic acid/4-aminophenol copolymer.
(r) 4-hydroxybenzoic acid/2-hydroxy-6-naphthoic acid/terephthalic acid/4-aminophenol copolymer.
(s) 4-hydroxybenzoic acid/terephthalic acid/4,4'-dihydroxybiphenyl/4-aminophenol copolymer.
(t) 4-hydroxybenzoic acid/terephthalic acid/ethylene glycol copolymer.
(u) 4-hydroxybenzoic acid/terephthalic acid/4,4'-dihydroxybiphenyl/ethylene glycol copolymer.
(v) 4-hydroxybenzoic acid/2-hydroxy-6-naphthoic acid/terephthalic acid/ethylene glycol copolymer.
(w) 4-hydroxybenzoic acid/2-hydroxy-6-naphthoic acid/terephthalic acid/4,4'-dihydroxybiphenyl/ethylene glycol copolymer.
(x) 4-hydroxybenzoic acid/terephthalic acid/2,6-naphthalene dicarboxylic acid/4,4'-dihydroxybiphenyl copolymer.

Among the above exemplifications, the copolymer (b) or (c) is preferable, and the copolymer (c) is further preferable. Namely, it is preferable that the group $Ar^1$ be a 1,4-phenylene group, the group $Ar^2$ be a 1,4-phenylene group or a 1,3-phenylene group, the group $Ar^3$ be a biphenylene group, and both X and Y be oxygen atoms.

The amount of the repeating unit (1) in the liquid crystal polyester resin relative to the total amount of repeating units constituting the liquid crystal polyester resin is preferably at least 30% by mol, more preferably 30% by mol to 80% by mol, even more preferably 30% by mol to 70% by mol, and particularly preferably 35% by mol to 65% by mol. The total amount of repeating units constituting the liquid crystal polyester resin is a value obtained by summing the substance equivalent (mol) of each repeating unit constituting the liquid crystal polyester resin, the substance equivalent being obtained by dividing the mass of each repeating unit by the formula mass of each repeating unit.

In the case where the amount of the repeating unit (1) in the liquid crystal polyester resin is 30% by mol or more, the heat resistance and the hardness of the molded article obtained using the liquid crystal polyester resin composition according to the present embodiment tend to be improved. In the case where the amount of the repeating unit (1) is 80% by mol or less, the melt viscosity can be lowered. Thus, the temperature required to mold the liquid crystal polyester resin tends to decrease.

The amount of the repeating unit (2) in the liquid crystal polyester resin relative to the total amount of repeating units constituting the liquid crystal polyester resin is preferably 35% by mol or less, more preferably 10% by mol to 35% by mol, even more preferably 15% by mol to 35% by mol, and particularly preferably 17.5% by mol to 32.5% by mol.

The amount of the repeating unit (3) in the liquid crystal polyester resin relative to the total amount of repeating units constituting the liquid crystal polyester resin is preferably 35% by mol or less, more preferably 10% by mol to 35% by mol, even more preferably 15% by mol to 35% by mot, and particularly preferably 17.5% by mol to 32.5% by mol.

The sum of the amount of the repeating unit (1) in the liquid crystal polyester resin, the amount of the repeating unit (2) in the liquid crystal polyester resin and the amount of the repeating unit (3) in the liquid crystal polyester resin does not exceed 100% by mol.

The ratio of the amount of the repeating unit (2) to the amount of the repeating unit (3), ([the amount of the repeating unit (2)]/[the amount of the repeating unit (3)]) (mol/mol), in the liquid crystal polyester resin is preferably 0.9 to 1.1, more preferably 0.95 to 1.05, and even more preferably 0.98 to 1.02.

The ratio of the repeating unit (3) to the amount of the repeating unit (1), ([the amount of the repeating unit (3)]/[the amount of the repeating unit (1)]) (mol/mol), in the liquid crystal polyester resin is preferably 0.2 to 1.0, more preferably 0.25 to 0.85, and even more preferably 0.3 to 0.75.

The molar ratio y/x of the repeating unit (2) in the liquid crystal polyester resin is preferably more than 0 and 1 or less, more preferably 0.1 to 0.9, and even more preferably 0.2 to 0.8.

x indicates the molar amount of the repeating unit in which $Ar^2$ is a 1,4-phenylene group.

y indicates the molar amount of the repeating unit in which $Ar^2$ is a 1,3-phenylene group.

The liquid crystal polyester resin may each independently contain one or at least two types of the repeating units (1) to (3). In addition, although the liquid crystal polyester resin may contain one or at least two types of repeating units other than the repeating units (1) to (3), the amount thereof relative to the total amount of all repeating units is preferably 10% by mol or less, and more preferably 5% by mol or less.

[Liquid Crystal Polyester Resin Mixture]

A liquid crystal polyester resin mixture in which a plurality of types of the liquid crystal polyester resin is mixed may be used in the present embodiment. Such a use further improves the melt fluidity of the liquid crystal polyester resin composition according to the present embodiment and sufficiently suppresses warpage of the resultant molded article.

The amount of the liquid crystal polyester resin mixture according to the present embodiment relative to the total mass of the liquid crystal polyester resin composition may be preferably 30% by mass to 90% by mass, more preferably 40% by mass to 80% by mass, and even more preferably 50% by mass to 70% by mass.

A mixture of liquid crystal polyester resins having different flow initiation temperatures is considered as the liquid crystal polyester resin mixture. In the liquid crystal polyester resin mixture, a liquid crystal polyester resin having a higher flow initiation temperature is referred to as a first liquid crystal polyester resin, and a liquid crystal polyester resin having a lower flow initiation temperature is referred to as a second liquid crystal polyester resin.

The flow initiation temperature of the first liquid crystal polyester resin is preferably 300° C. or more, more preferably 310° C. or more, and even more preferably 315° C. or more. The flow initiation temperature of the first liquid crystal polyester resin is preferably 400° C. or less, more preferably 360° C. or less, and even more preferably 345° C. or less. The upper limit and the lower limit may be combined arbitrarily.

For example, the flow initiation temperature of the first liquid crystal polyester resin is preferably 300° C. to 400° C., more preferably 310° C. to 360° C., and even more preferably 315° C. to 345° C.

In the case where the flow initiation temperature of the first liquid crystal polyester resin is within the above-mentioned range, both the melt fluidity of the resin and the heat resistance of the resultant molded article tend to be realized.

In contrast, the flow initiation temperature of the second liquid crystal polyester resin is preferably 260° C. or more, more preferably 270° C. or more, and even more preferably 285° C. or more. The flow initiation temperature of the second liquid crystal polyester resin is preferably 350° C. or less, more preferably 320° C. or less, and even more preferably 315° C. or less. The upper limit and the lower limit may be combined arbitrarily. For example, the flow initiation temperature of the second liquid crystal polyester resin is preferably 260° C. to 350° C., more preferably 270° C. to 320° C., and even more preferably 285° C. to 315° C.

In the case where the flow initiation temperature of the second liquid crystal polyester resin is within the above-mentioned range, the fluidity in a thin-walled portion of a mold (thin-walled fluidity) tends to become favorable, and the deflection temperature of the resultant molded article under load tends to be sufficiently increased.

In addition, the amount of the second liquid crystal polyester resin relative to 100 parts by mass of the first liquid crystal polyester resin in the liquid crystal polyester resin mixture is preferably 10 parts by mass to 150 parts by mass, more preferably 30 parts by mass to 120 parts by mass, and even more preferably 50 parts by mass to 100 parts by mass.

The amount of the second liquid crystal polyester resin relative to the first liquid crystal polyester resin may be appropriately determined such that the liquid crystal polyester resin mixture realizes the balance between the deflection temperature under load and the thin-walled fluidity in a predetermined state.

The liquid crystal polyester resin mixture may further contain a liquid crystal polyester resin other than both the first liquid crystal polyester resin and the second liquid crystal polyester resin. In this case, a resin having a highest flow initiation temperature may be contained as the first liquid crystal polyester resin and a resin having the lowest flow initiation temperature may be contained as the second liquid crystal polyester resin in the resin mixture. It is preferable that the liquid crystal polyester resin mixture substantially consist of the first liquid crystal polyester resin and the second liquid crystal polyester resin.

In the present specification, the phrase "the liquid crystal polyester resin mixture substantially consists of the first liquid crystal polyester resin and the second liquid crystal polyester resin" means that the total mass of the first liquid crystal polyester resin and the second liquid crystal polyester resin relative to the total mass of the liquid crystal polyester resin mixture is preferably 90% by mass to 100% by mass, and more preferably 95% by mass to 100% by mass.

It is preferable that the ratio α/β in the liquid crystal polyester resin mixture be within a range of 0.1 to 0.6, and more preferably within a range of 0.3 to 0.6.

α indicates the molar ratio y/x of the first liquid crystal polyester resin.

β indicates the molar ratio y/x of the second liquid crystal polyester resin.

x indicates the molar amount of the repeating unit in which $Ar^2$ is a 1,4-phenylene group.

y indicates the molar amount of the repeating unit in which $Ar^2$ is a 1,3-phenylene group.

[Preparation Method of Liquid Crystal Polyester Resin]

Next, one embodiment of the preparation method of the liquid crystal polyester resin according to the present embodiment will be explained.

The liquid crystal polyester resin according to the present embodiment is preferably prepared by conducting the following acylation step and polymerization step.

The acylation step is a step in which a phenolic hydroxyl group contained in a feedstock monomer is acylated by a fatty acid anhydride (such as acetic anhydride) to obtain an acylated compound.

A liquid crystal polyester resin may be obtained in the polymerization step by polymerizing acyl groups of the acylated compounds obtained in the acylation step and carboxy groups of acylated compounds of an aromatic dicarboxylic acid and an aromatic hydroxycarboxylic acid such that transesterification is allowed to proceed.

The acylation step and the polymerization step may be conducted in the presence of a heterocyclic organic base compound of the following formula (5).

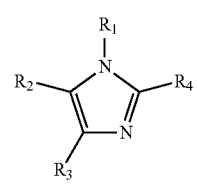

(5)

In the formula (5), $R_1$ to $R_4$ are each independently a hydrogen atom, a C1-4 alkyl group, a hydroxymethyl group, a cyano group, a cyanoalkyl group in which the carbon number of an alkyl group is 1 to 4, a cyanoalkoxy group in which the carbon number of an alkoxy group is 1 to 4, a carboxy group, an amino group, a C1-4 aminoalkyl group, a C1-4 aminoalkoxy group, a phenyl group, a benzyl group, a phenylpropyl group or a formyl group.

It is preferable that the heterocyclic organic base compound of the formula (5) be an imidazole derivative in which $R_1$ be a C1-4 alkyl group, and all of $R_2$ to $R_4$ be hydrogen atoms. Thus, the reactivity at the acylation reaction in the acylation step and that at the transesterification reaction in the polymerization step can be improved. In addition, the color of the molded article obtained using the liquid crystal polyester resin composition according to the present embodiment can be improved.

Among the heterocyclic organic base compounds, either 1-methylimidazole or 1-ethylimidazole or both thereof is particularly preferable from the viewpoint of easy availability.

The used amount of the heterocyclic organic base compound, relative to 100 parts by mass of the total amount of feedstock monomers of the liquid crystal polyester resin (that is, an aromatic dicarboxylic acid, an aromatic diol and an aromatic hydroxycarboxylic acid), is preferably 0.005 parts by mass to 1 part by mass. The used amount, relative to 100 parts by mass of the feedstock monomers, is more preferably 0.05 parts by mass to 0.5 parts by mass from the viewpoint of the color and the productivity of the molded article.

The heterocyclic organic base compound may be temporarily present at the acylation reaction and the transesterification reaction, and may be added immediately before the initiation of the acylation reaction, during the acylation reaction, or at a time between the acylation reaction and the transesterification reaction. The thus obtained liquid crystal polyester resin has a very high melt fluidity and an excellent thermal stability.

The used amount of the fatty acid anhydride (such as acetic anhydride) is determined taking into account the used amount of the aromatic diol and the aromatic hydroxycarboxylic acid as feedstock monomers. Specifically, the used amount relative to the total amount of phenolic hydroxyl groups contained in the feedstock monomers is preferably 1.0-fold equivalent to 1.2-fold equivalents, more preferably 1.0-fold equivalent to 1.15-fold equivalents, even more preferably 1.03-fold equivalents to 1.12-fold equivalents, and particularly preferably 1.05-fold equivalents to 1.1-fold equivalents.

In the case where the used amount of the fatty acid anhydride relative to the total amount of phenolic hydroxyl groups contained in the feedstock monomers is 1.0-fold equivalent or more, the acylation reaction readily proceeds, and unreacted feedstock monomers rarely remain in the subsequent polymerization step, thereby allowing the polymerization to proceed efficiently. In addition, in the case where the acylation reaction is allowed to proceed sufficiently in such a manner, unacylated feedstock monomers are sublimated, and therefore the possibility of occlusion in a fractionator used in the polymerization process is low. In contrast, in the case where the used amount of the fatty acid anhydride is 1.2-fold equivalents or less, the resultant liquid crystal polyester resin hardly colors.

The acylation reaction in the acylation step is preferably conducted at a temperature of 130° C. to 180° C. for 30 minutes to 20 hours, and more preferably at a temperature of 140° C. to 160° C. for 1 hour to 5 hours.

The aromatic dicarboxylic acid to be used in the polymerization step may be made to be present in the reaction system in the acylation step. Namely, the aromatic diol, the aromatic hydroxycarboxylic acid and the aromatic dicarboxylic acid may be made to be present in the same reaction system in the acylation step. This is because carboxy groups and arbitrarily substitutable substituents in the aromatic dicarboxylic acid are not affected by the fatty acid anhydride.

Accordingly, either a method in which the aromatic diol, the aromatic hydroxycarboxylic acid and the aromatic dicarboxylic acid are charged in a reactor, followed by conducting the acylation step and the polymerization step sequentially, or a method in which the aromatic diol and the aromatic dicarboxylic acid are charged in a reactor to conduct the acylation step, followed by further charging the aromatic dicarboxylic acid in the reactor to conduct the polymerization step may be adopted. The former method is preferable from the viewpoint of simplifying the preparation step.

The transesterification reaction in the polymerization step is preferably conducted while raising the temperature at a temperature rising rate of 0.1° C./minute to 50° C./minute within a range of 130° C. to 400° C., more preferably at a temperature rising rate of 0.3° C./minute to 5° C./minute within a range of 150° C. to 350° C.

It is preferable that fatty acids produced as by-products (such as acetic acid) and unreacted fatty acid anhydrides (such as acetic anhydride) be evaporated to be distilled off outside the reaction system so as to shift equilibrium of the transesterification reaction in the polymerization step. At the time, a portion of distillate fatty acids may be refluxed to be returned to the reactor, thereby making it possible to condense or reverse-sublimate feedstock monomers evaporated or sublimated together with the fatty acids to be returned to the reactor.

The acylation reaction in the acylation step and the transesterification reaction in the polymerization step may be performed using a batch-wise reactor or a continuous reactor. The use of any of the reactors makes it possible to obtain the liquid crystal polyester resin available in the present embodiment.

A step in which the molecular weight of the liquid crystal polyester resin obtained in the polymerization step is increased may be conducted after the polymerization step. For example, the liquid crystal polyester resin obtained in the polymerization step is cooled, and then pulverized to obtain a powdered liquid crystal polyester resin, followed by heating the powdered liquid crystal polyester resin, as a result of which the molecular weight of the liquid crystal polyester resin can be increased.

Alternatively, the powdered liquid crystal polyester resin obtained by the cooling and pulverizing process may be granulated to obtain a pelletized liquid crystal polyester resin, followed by heating the pelletized liquid crystal polyester resin to increase the molecular weight of the liquid crystal polyester resin. The process in which the molecular weight is increased using the above-mentioned methods is referred to as "solid phase polymerization" in the art.

The solid phase polymerization is particularly useful as a method for increasing the molecular weight of a liquid crystal polyester resin. The increase in the molecular weight of the liquid crystal polyester resin makes it easy to obtain a liquid crystal polyester resin having a favorable flow initiation temperature as mentioned below.

As the reaction conditions of the solid phase polymerization, a method in which a resin in a solid state is thermally treated under an inert gas atmosphere or under reduced pressure for 1 hour to 20 hours is typically employed. The polymerization conditions of the solid phase polymerization can be appropriately optimized after determining the flow initiation temperature of the resin obtained by the melt polymerization. Examples of a device used to conduct the thermal treatment include known dryers, reactors, inert ovens and electric furnaces.

The flow initiation temperature of the liquid crystal polyester resin is preferably 270° C. or more, more preferably 270° C. to 400° C., and even more preferably 280° C. to 380° C. In the case where the liquid crystal polyester resin having a flow initiation temperature within the above-mentioned range is used, the heat resistance of the resultant molded article obtained from the liquid crystal polyester resin composition according to the present invention can be further improved. In addition, the thermal stability of the liquid crystal polyester resin is improved to avoid thermal deterioration in melt molding to obtain the molded article from the liquid crystal polyester resin composition.

The flow initiation temperature is also referred to as flow temperature or flowing temperature, is a temperature at which the viscosity shows 4.800 Pa·s (48,000 poise) when the liquid crystal polyester resin is melted by increasing the temperature thereof at a rate of 4° C./minute under a load of 9.8 MPa using a capillary rheometer and is extruded from a nozzle having an inner diameter of 1 mm and a length of 10 mm, and is a standard showing the molecular weight of liquid crystal polyester resin (see, for example, "Liquid Crystal Polymer-Synthesis-Molding-Application" edited by Naoyuki Koide, pp 95-105, CMC, issued on Jun. 5, 1987).

The liquid crystal polyester resin having the above-mentioned suitable flow initiation temperature can be easily obtained by appropriately optimizing structural units constituting the liquid crystal polyester resin. Namely, the flow initiation temperature tends to increase when the linearity of a molecular chain of the liquid crystal polyester resin is improved.

For example, a structural unit derived from terephthalic acid improves the linearity of a molecular chain of the liquid crystal polyester resin. In contrast, a structural unit derived from isophthalic acid improves the flexibility of a molecular chain of the liquid crystal polyester resin (causes deterioration of linearity). Therefore, a liquid crystal polyester resin having a desired flow initiation temperature can be obtained by controlling a copolymerization ratio of terephthalic acid and isophthalic acid.

In the case where the above-mentioned liquid crystal polyester resin mixture is used, it is preferable that at least one liquid crystal polyester resin be a polymer obtained by polymerizing feedstock monomers including an aromatic hydroxycarboxylic acid in the presence of an imidazole compound. The thus obtained liquid crystal polyester resin exhibits a very high fluidity at a melt process and an excellent thermal stability.

In addition, it is preferable that the copolymerization ratio of terephthalic acid and isophthalic acid in the liquid crystal polyester resin available in the present embodiment be optimized. Thus, the linearity of a molecular chain of the liquid crystal polyester resin can be controlled as mentioned above. As a result, a plurality of types of liquid crystal polyester resin, the flow initiation temperature of which is different from each other, can be prepared.

The amount of the liquid crystal polyester resin in the liquid crystal polyester resin composition according to the present embodiment, relative to the total mass of the liquid crystal polyester resin composition, is preferably 30% by mass to 90% by mass, more preferably 40% by mass to 80% by mass, and even more preferably 50% by mass to 70% by mass.

[Inorganic Filler]

An inorganic filler available in the present embodiment may be a fibrous filler, a tabular filler, or a particulate filler.

The amount of the inorganic filler in the liquid crystal polyester resin composition according to the present embodiment, relative to 100 parts by mass of the liquid crystal polyester resin, is preferably more than 0 parts by mass and 100 parts by mass or less, more preferably 10 parts by mass to 100 parts by mass, even more preferably 20 parts by mass to 90 parts by mass, and particularly preferably more than 20% by mass and 80% by mass or less.

Examples of the fibrous filler include: glass fibers; carbon fibers such as PAN-based carbon fibers and pitch-based carbon fibers; ceramic fiber such as silica fibers, alumina fibers, and silica alumina fibers; and metal fibers such as stainless steel fibers. Examples of the glass fibers include chopped glass fibers and milled glass fibers. Additional examples of the fibrous filler include whiskers such as a potassium titanate whiskers, a barium titanate whiskers, a wollastonite whiskers, an aluminum borate whiskers, a silicon nitride whiskers, and a silicon carbide whiskers.

The chopped glass fiber (glass chopped strand) is obtained by cutting a fiber bundle (glass strand) such that the length thereof becomes 1.5 mm to 25 mm, the fiber bundle being obtained by directly pulling together plural glass monofilaments taken up from a spinning nozzle to collect a bundle.

The milled glass fiber (milled fiber) is obtained by pulverizing or cutting strands such that the length thereof becomes extremely short (approximately less than 1 mm).

Examples of the tabular inorganic filler include talc, mica, graphite, wollastonite, glass flake, barium sulfate and calcium carbonate. Mica may be white mica, gold mica, fluorine gold mica or tetrasilicon mica.

Examples of the particulate inorganic filler include silica, alumina, titanium oxide, glass bead, glass balloon, boron nitride, silicon carbide and calcium carbonate.

The inorganic filler available in the present embodiment is preferably at least one selected from the group consisting of chopped glass fiber, milled glass fiber, talc and mica, and, among these, the inorganic filler is more preferably mica.

[Glass Fiber]

Hereinafter, the details will be described with reference to glass fiber available in the present embodiment as the fibrous filler.

The number-average fiber length of the glass fiber contained in the liquid crystal polyester resin composition according to the present embodiment is preferably 20 µm to 1000 µm.

In the case where the number-average fiber length of the glass fiber is 1000 µm or less, the fluidity of the liquid crystal polyester resin composition is increased when the pellet according to the present embodiment is weighed using a molding machine. As a result, the liquid crystal polyester resin composition is easily formed. In contrast, in the case where the number-average fiber length of the glass fiber according to the present embodiment is 20 µm or more, the flexural modulus of elasticity of a molded article obtained by molding the pellet according to the present embodiment is increased.

The number-average fiber length of the glass fiber is more preferably 30 n or more, even more preferably 40 µm or more, and particularly preferably 45 µm or more. The number-average fiber length of the glass fiber is more preferably 800 μm or less, and even more preferably 500 μm or less.

The glass fiber contained in the liquid crystal polyester resin composition according to the present embodiment preferably has an approximate circular cross-sectional shape in a radial direction. The approximate circular cross-sectional shape in a radial direction of the glass fiber can be confirmed by SEM.

The diameter of the glass fiber is preferably 5 μm to 17 μm, more preferably 6 μm to 15 μm, and even more preferably 9 μm to 12 μm.

(Amount Ratio)

The amount of the glass fiber in the liquid crystal polyester resin composition according to the present embodiment, relative to 100 parts by mass of the liquid crystal polyester resin, is preferably more than 0 parts by mass and 100 parts by mass or less, and more preferably 10 parts by mass to 100 parts by mass. In the case where the amount of the glass fiber is 10 parts by mass to 100 parts by mass, both the molding processability of the liquid crystal polyester resin composition and the mechanical strength of the molded article become excellent.

In the case where the amount of the glass fiber is excessively low, the ratio of shrinkage in the fluid direction of a molded article to shrinkage in the vertical direction thereof increases, and warpage or flexure tends to occur in the molded article. In the case where the amount of the glass fiber is excessively high, the fluidity of the resin composition during molding becomes poor and the molding processability tends to deteriorate.

The amount of the glass fiber relative to 100 parts by mass of the liquid crystal polyester resin is preferably 10 parts by mass to 70 parts by mass, and more preferably 20 parts by mass to 60 parts by mass.

Examples of the glass fiber include E-glass, A-glass, C-glass, D-glass, AR-glass, R-glass, S-glass and mixtures thereof. Among these, the E-glass is preferable from the viewpoint of excellent strength and easy availability.

A weakly alkaline fiber has excellent mechanical strength (tensile strength and Izod impact strength), and thus is preferably used as the glass fiber. Particularly, a glass fiber, in which the amount of silicon oxide relative to the total mass of the glass fiber is 50% by mass to 80% by mass, and more preferably 65% by mass to 77% by mass, is preferably used.

The glass fiber may be treated with a coupling agent such as a silane-based coupling agent or a titanium-based coupling agent, as needed.

The glass fiber may be coated with a thermoplastic resin such as a urethane resin, an acrylic resin, or an ethylene/vinyl acetate copolymer, or a thermosetting resin such as an epoxy resin. The raw fiber may be treated with a sizing agent.

(Measurement Method of the Number-Average Fiber Length of the Glass Fiber)

The number-average fiber length of the glass fiber is measured as described below.

First, 5 g of a pellet of the liquid crystal polyester resin composition according to the present embodiment is heated in a muffle furnace (manufactured by Yamato Scientific co., ltd., under the model number of "FP410") under an air atmosphere at 600° C. for 4 hours to remove resin therefrom, thereby obtaining an incinerated residue containing glass fiber. 0.3 g of the incinerated sample was charged into 50 mL of pure water, and an aqueous solution containing 0.5% by volume of micro-90 (manufactured by Sigma-Aldrich Japan) was added thereto as a surfactant so as to improve the dispersibility, thereby obtaining a mixture liquid. The resultant mixture liquid is subjected to ultrasonication for 5 minutes to make the incinerated sample disperse uniformly in pure water, thereby obtaining a sample liquid.

Then, 5 mL of the sample liquid in which the glass fiber is dispersed in pure water is put in a 5 mL sample cup using a pipette, and then diluted 5-fold with pure water, thereby obtaining a sample liquid. The resultant sample liquid is passed through a flow cell using a particle shape image analyzer (manufactured by SEISHIN ENTERPRISE Co., Ltd., under the model number of "PITA3") under the following conditions, and glass components moving in the liquid are imaged one by one. The measurement is ended when the number of glass fibers accumulated from the measurement starting time reaches 5000 in the above-mentioned measurement method.

(Conditions)

Number of measurement: 5000

Dispersion solvent: Water

Dispersion condition: Aqueous solution containing 0.5% by volume micro-90 is used as carrier liquid 1 and carrier liquid 2.

Speed of sample liquid: 2.08 μL/second

Speed of carrier liquid 1: 333.33 μL/second

Speed of carrier liquid 2: 333.33 μL/second

Observation magnification: Objective, 10×

The obtained images are binarized, the major axis of circumscribed rectangle of the glass fibers are measured in the processed images and the average value of 5000 measured values is defined as the number-average fiber length of the glass fiber.

In the present specification, the term "major axis of circumscribed rectangle" refers to the length of a long side of a rectangle circumscribed around a particle.

(Measurement method of diameter of glass fiber)

Incinerated residues containing the above-mentioned glass fiber are observed by a SEM at 1000-times magnification, the diameters of 100 particles of the glass fiber randomly selected from the SEM images are measured, and then the average value of the 100 measured values is defined as the diameter of the glass fiber according to the present embodiment.

[Talc]

Hereinafter, the details will be described with reference to talc available in the present embodiment as the tabular filler.

The talc used in the present embodiment is a pulverized mineral composed of magnesium hydroxide and mineral silicate. In addition, the talc used in the present embodiment has a structure in which an octahedral structure formed of three magnesium (Mg) oxides and hydroxides is interposed between four tetrahedral structures formed of four silicon (Si) oxide atoms.

Examples of a preparation method of the talc used in the present embodiment include conventionally-known preparation methods, such as dry milling methods such as grinding-type milling methods using a roller mill or a Raymond mill, impact-type milling methods using an atomizer, a hammer mill, or a micron mill, and collision-type milling methods using a jet mill or a ball mill.

In addition, a wet milling method may be used in which ground talc powder is dispersed with water to form a slurry having a flowable viscosity and then pulverized by a ball mill, a bead mill, a wet jet mill, a Discoplex, or the like. Among the above-described manufacturing methods, the dry milling method is preferable from the viewpoint of low cost and easy availability.

The surface of the talc used in the present embodiment may be treated with a coupling agent or the like so as to improve the wettability between the talc and the resin (liquid crystal polyester resin). In addition, a talc thermally treated to remove impurities and harden the talc may be used. In addition, a talc compressed to facilitate handling may be used.

(Residue on Sieve)

The amount of the residue on a 45 μm sieve, the residue being contained in the talc used in the present embodiment, is preferably 1.0% by mass or less. In the case where the amount of the residue on a 45 μm sieve is 1.0% by mass or less, the clogging at a thin-walled portion of a mold is suppressed when the pellet according to the present embodiment is molded, thereby improving the moldability and the thin-walled strength of the resultant molded article. In the case where the amount of the residue on a 45 μm sieve is 1.0% by mass or less, the clogging at a gate portion due to the talc when the liquid crystal polyester resin composition is molded is suppressed, thereby suppressing the generation of underfill of the molded article. The amount of the residue on a 45 μm sieve, the residue being contained in the talc, relative to the total amount of the talc, is preferably 0.8% by mass or less, and more preferably 0.6% by mass or less.

In the present specification, the amount of the residue on a 45 μm sieve, the residue being contained in the talc, is measured in accordance with JIS K 5101-14-1 "Pigment test method—Part 14: Residue on sieve—Section 1: Wet method (manual method)".

(Ignition Loss)

The ignition loss (Ig. Loss) of the talc used in the present embodiment is preferably 7% by mass or less, more preferably 6% by mass or less, and particularly preferably 5% by mass or less. The lower the Ig. Loss, the less likely blisters are generated due to the suppression of the decomposition of the liquid crystal polyester resin.

The Ig. Loss is measured in accordance with JIS M8853.

The amount of the talc in the liquid crystal polyester resin composition according to the present embodiment, relative to 100 parts by mass of the liquid crystal polyester resin, is preferably more than 0 parts by mass and 100 parts by mass or less, more preferably 10 parts by mass to 100 parts by mass, even more preferably 10 parts by mass to 85 parts by mass, and particularly preferably 20 parts by mass to 65 parts by mass.

In the case where the amount of the talc in the liquid crystal polyester resin composition is within the above-mentioned range, both the molding processability and the mechanical strength of a molded article are excellent.

[Mica]

Hereinafter, the details will be described with reference to mica available in the present embodiment as the tabular filler.

Mica is a pulverized mineral silicate containing aluminum, potassium, magnesium, sodium, iron, and the like. In addition, mica is a mineral having a structure in which an octahedral structure formed of three metal oxides and hydroxides is interposed between four tetrahedral structures formed by oxides of three silicon (Si) atoms and one aluminum (Al) atom.

The mica used in the present embodiment may be any of white mica, gold mica, fluorine gold mica, tetrasilicon mica, and synthesized mica artificially prepared. At least two thereof may be contained together.

It is preferable that the mica used in the present embodiment substantially consist of white mica.

Examples of a preparation method of the mica used in the present embodiment include water flow type jet milling, wet milling, dry type ball milling, pressure roller milling, airflow type jet milling, and dry milling using an impact mill such as an atomizer. It is preferable to use mica prepared by the wet milling method from the viewpoint that the mica can be thinly and finely ground.

In the case where the wet milling method is conducted, unground mica is dispersed in water. At the time, an additive such as an agglomeration and precipitation agent or a precipitation aid, such as polyaluminum chloride, aluminum sulfate, aluminum sulfate, ferrous sulfate, ferric sulfate, chlorinated copperas, polyferric sulfate, polyferric chloride, iron-silica inorganic polymer flocculant, ferric chloride-silica inorganic polymer flocculant, hydrated lime (Ca(OH)$_2$), caustic lime (NaOH), or soda ash (Na$_2$CO$_3$), is generally added so as to improve the dispersion efficiency of the unground mica. However, these additives may cause decomposition of the liquid crystal polyester. Therefore, it is preferable that neither agglomeration and precipitation agent nor precipitation aid be used before wet milling the mica to be used in the present embodiment.

The amount of the mica in the liquid crystal polyester resin composition according to the present embodiment, relative to 100 parts by mass of the liquid crystal polyester resin, is preferably more than 0 parts by mass and 100 parts by mass or less, more preferably 10 parts by mass to 100 parts by mass, even more preferably 20 parts by mass to 90 parts by mass, and particularly preferably more than 20% by mass and 80% by mass or less.

In the case where the amount of the mica in the liquid crystal polyester resin composition is within the above-mentioned range, both the molding processability and the mechanical strength of the molded article are excellent.

(Volume-Average Particle Size)

The lower limit of the volume-average particle size of the tabular filler contained in the liquid crystal polyester resin composition according to the present embodiment is preferably 5 μm or more. Thus, warpage of a molded article formed from the pellet according to the present embodiment becomes small.

The lower limit of the volume-average particle size of the tabular filler contained in the liquid crystal polyester resin composition according to the present embodiment is more preferably 5.5 μm or more, and even more preferably 6 μm or more.

The upper limit of the volume-average particle size of the tabular filler is preferably 50 μm or less. In the case where the volume-average particle size of the tabular filler is 50 μm or less, the miscibility of the tabular filler with the liquid crystal polyester resin becomes favorable, thereby making it difficult to cause flow inhibition of the liquid crystal polyester resin composition. As a result, it becomes easy to maintain the fluidity of the liquid crystal polyester resin composition uniformly. Accordingly, it is easy to fill thin-walled portions or grid portions having a narrow pitch of a used mold with the liquid crystal polyester resin composition.

The upper limit of the volume-average particle size of the tabular filler contained in the liquid crystal polyester resin composition according to the present embodiment is more preferably 24 m or less, even more preferably 20 μm or less, and particularly preferably 15 m or less.

For example, the volume-average particle size of the tabular filler contained in the liquid crystal polyester resin composition according to the present embodiment is preferably 5 μm to 50 μm, more preferably 5.5 μm to 24 μm, and particularly preferably 6 μm to 20 μm.

The volume-average particle size of the tabular filler may be measured by a laser diffraction method in the present embodiment. The volume-average particle size may be determined under the following measurement conditions using a scattering particle size distribution measurement device manufactured by HORIBA. Ltd., under the model number of "LA-950V2" as a measurement device, while maintaining the state in which the tabular fillers are dispersed in water.

(Measurement Conditions)
 Particle refractive index: 1.59-0.1 i (talc), 1.57-0.1 i (mica)
 Dispersing medium: water
 Dispersing medium refractive index: 1.33 (in the case of water)

(Thickness)

The lower limit of the thickness of the tabular filler contained in the liquid crystal polyester resin composition according to the present embodiment is preferably 0.10 μm or more, more preferably 0.20 μm or more, and even more preferably 0.30 μm or more. Thus, warpage of the resultant molded article can be reduced.

The upper limit of the thickness of the tabular filler contained in the liquid crystal polyester resin composition according to the present embodiment is preferably 1.0 μm or less, more preferably 0.95 μm or less, and even more preferably 0.90 μm or less. Thus, the tabular filler can be dispersed uniformly in the liquid crystal polyester resin composition. As a result, it becomes easy to maintain the fluidity of the liquid crystal polyester resin composition uniformly. Accordingly, it is easy to fill thin-walled portions or grid portions having a narrow pitch of a used mold with the liquid crystal polyester resin composition.

For example, the thickness of the tabular filler contained in the liquid crystal polyester resin composition according to the present embodiment is preferably 0.10 μm to 1.0 μm, more preferably 0.20 μm to 0.95 μm, and even more preferably 0.30 μm to 0.90 μm.

The thickness of the tabular filler according to the present embodiment is measured by observation using an electron microscope at 1000-times magnification. At least 10 monolayers thinly peeled from the tabular filler are randomly selected, and then the average value of the measured thickness thereof is defined as the thickness of the tabular tiller according to the present embodiment.

[Other Components]

The liquid crystal polyester resin composition may contain at least one other component such as an organic filler, an additive, or a resin other than the liquid crystal polyester resin, within the range in which effects of the present invention are exhibited.

Examples of the organic filler include polyester fiber, aramid fiber, and cellulose fiber.

Examples of the additive include additives conventionally used in resin compositions. Examples of such an additive include stabilizers, ultraviolet absorbers, plasticizers, flame-retardant agents, flame-retardant aids, antistatic agents, surfactants, coloring agents, lubricant agents, and mold release agents.

Examples of the stabilizers include hindered phenols, hydroquinone, phosphites, and substitution products thereof.

Examples of the ultraviolet absorbers include resorcinol, salicylate, benzotriazole, and benzophenone.

Examples of the coloring agent include materials containing dyes such as nitrosine, or pigments such as cadmium sulfide, phthalocyanine, or carbon black.

Examples of the lubricant agent include stearic acid, montanic acid, esters thereof, half-esters thereof with polyhydric alcohols, stearyl alcohol, stearamide, and polyethylene waxes.

The molding processability of the liquid crystal polyester resin composition according to the present embodiment can be improved by further adding a mold release agent thereto. Examples of the mold release agent include montanic acid, salts thereof, esters thereof, half-esters thereof with polyhydric alcohols, stearyl alcohol, stearamide, and polyethylene waxes, and fatty acid esters of pentaerythritol are preferable.

The amount of the mold release agent, relative to 100 parts by mass of the liquid crystal polyester resin, is preferably 0.1 parts by mass to 1.0 parts by mass, more preferably 0.2 parts by mass to 0.8 parts by mass, and even more preferably 0.2 parts by mass to 0.7 parts by mass. In the case where the amount of the mold release agent is 0.1 parts by mass to 1.0 parts by mass, the contamination of a used mold or the swelling of a molded article tends to be hardly caused, and mold release effects are easily obtained.

The amount of the mold release agent, relative to 100 parts by mass of the total of the liquid crystal polyester resin and the inorganic filler, is preferably 0.1 parts by mass to 0.5 parts by mass, and more preferably 0.2 parts by mass to 0.4 parts by mass. In the case where the amount of the mold release agents is 0.1 parts by mass to 0.5 parts by mass, the contamination of a used mold or the swelling of a molded article tends to be hardly caused, and mold release effects are easily obtained.

Examples of resins other than the liquid crystal polyester resin include thermoplastic resins other than the liquid crystal polyester, such as polypropylenes, polyamides, polyesters other than the liquid crystal polyester, polysulfones, polyethersulfones, polyphenylene sulfides, polyetherketones, polycarbonates, polyphenylene ethers and polyetherimides; and thermosetting resins such as phenol resins, epoxy resins, polyimide resins, and cyanate resins. The amount of resins other than the liquid crystal polyester resin, relative to 100 parts by mass of the liquid crystal polyester resin, is generally 0 parts by mass to 20 parts by mass.

In the pellet according to the present embodiment, the smaller the area ratio S/S0, the easier the liquid crystal polyester resin is orientated, and the easier cracking of the pellet occurs. The difficulty in cracking of the pellet can be evaluated by the compressive strength of the pellet.

The compressive strength of the pellet according to the present embodiment is preferably 90 N/m or more, and more preferably 95 N/m or more. In the case where the compressive strength of the pellet is 90 N/m or more, generation of fine powders caused by cracking of the pellet can be sufficiently suppressed.

An increase in the compressive strength of the pellet according to the present embodiment is preferable from the viewpoint that the generation of the fine powders of the pellet is suppressed, and the upper limit of the compressive strength of the pellet according to the present embodiment is 200 N/m or less, for example.

For example, the compressive strength of the pellet according to the present embodiment is preferably 90 N/m to 200 N/m, and more preferably 95 N/m to 200 N/m.

The compressive strength of the pellet according to the present embodiment can be measured using a precision strength measurement device manufactured by Aikoh Engineering Co., Ltd., under the model number of "MODEL-1605 IIVL".

At first, one pellet is placed on a flat plate of the precision strength measurement device such that the direction of the length of the pellet becomes vertical to the flat plate. Then, the compressive strength is measured by loading the pressure in a direction of the minor axis in the cross-section by making a plate having a head thickness of 1 mm pass from the top surface of a cylindrical sample through the vicinity of the central portion of the top surface of the cylindrical sample, thereby measuring the strength at which the pellet is broken. The resultant strength is divided by the minor axis D2 of the cross-section of the measured pellet to determine the compressive strength of the pellet according to the present embodiment in the unit of N/mm. The measurement was conducted 5 times, and the average of the resultant values is adopted.

In the case where it is difficult to place the pellet on the flat plate as mentioned above, the pellet is treated to planarize the cross-section of the pellet before placing the pellet on the flat plate.

Effects of suppressing the generation of the fine powders caused by cracking of the pellet according to the present embodiment is evaluated by measuring the amount of fine powders generated from the pellet.

The amount of fine powders generated from the pellet according to the present embodiment is preferably 1000 ppm or less, and more preferably 700 ppm or less. Since the amount of fine powders generated from a pellet conventionally formed by using a resin other than the liquid crystal polyester resin, the area ratio S/S0 of the resin being less than 0.55 or more than 0.70, is approximately 100 ppm to 500 ppm, it is understood that 700 ppm or less of the amount of fine powders generated from the pellet is sufficiently low.

For example, the amount of fine powders generated from the pellet of the liquid crystal polyester resin composition according to the present embodiment is preferably 100 ppm to 1000 ppm, more preferably 100 ppm to 700 ppm, and even more preferably 100 ppm to 500 ppm.

The amount of fine powders generated from the pellet is measured by the following procedure.

The pellet is passed through a sieve having a mesh size of 1 mm to remove fine powders from the pellet, and then the weight of the pellet from which the fine powders are removed is measured. Then, the pellet from which the fine powders are removed is treated at a rotational speed of 30 rpm/minute using a tumbler manufactured by PLAENG under the model number of SKD-25 or the like for 20 minutes and then the pellet is collected. Then, fine powders generated from the pellet treated with the tumbler are separated therefrom using a sieve having a mesh size of 1 mm, followed by measuring the weight of the fine powders. The amount of generated fine powders is calculated from the weight of the pellet before being treated with the tumbler and the weight of generated fine powders.

The present invention encompasses the following aspects.
<1> A pellet of a liquid crystal polyester resin composition, containing: a liquid crystal polyester resin; and a mic as an inorganic filler, wherein
the amount of the liquid crystal polyester resin relative to the total mass of the liquid crystal polyester resin composition is preferably 50% by mass to 70% by mass, and more preferably 65% by mass,
the amount of the mica relative to 100 parts by mass of the liquid crystal polyester resin is preferably more than 20% by mass and 80% by mass or less, and more preferably 54 parts by mass,
the horizontal Feret length in the rectangle circumscribed around the front projected image of the pellet is taken as the length of the long side of the rectangle, the vertical Feret length is taken as the length of the short side of the rectangle,
the length of the long side of the rectangle is 3 mm to 4 mm, more preferably 3.1 mm to 3.5 mm, and
the area ratio S/S0 of the area S of the projected image to the area S0 of the rectangle is 0.55 to 0.70.
<2> The pellet of a liquid crystal polyester resin composition according to <1> mentioned above, wherein, when the direction of the length of the short side of the rectangle is defined as a radial direction of the pellet, the cross-section in a radial direction of the pellet has an elliptical shape, and
the length ratio D1/D2 of the major axis D1 to the minor axis D2 in the cross-section is 1.7 to 2.3.
<3> The pellet of a liquid crystal polyester resin composition according to <1> or <2> mentioned above, wherein the liquid crystal polyester resin is constituted by a repeating unit derived from 4-hydroxybenzoic acid, a repeating unit derived from terephthalic acid, a repeating unit derived from isophthalic acid, and a repeating unit derived from 4,4'-dihydroxybiphenyl.
<4> The pellet of a liquid crystal polyester resin composition according to any one of <1> to <3> mentioned above, further comprising a mold release agent, wherein
the amount of the mold release agent relative to 100 parts by mass of the total amount of the liquid crystal polyester resin and the inorganic filler is preferably 0.1 parts by mass to 0.5 parts by mass, and more preferably 0.3% by mass.

The pellet having such a constitution suppresses the generation of fine powders caused by cracking of the pellet.

<Preparation Method of the Pellet of the Liquid Crystal Polyester Resin Composition>

The preparation method of the pellet according to the present embodiment includes the following steps (i) to (v).

Step (i): Step in which a liquid crystal polyester resin, an inorganic filler, and other components used as needed are melt-kneaded by an extruder, followed by extruding the liquid crystal polyester resin composition from a nozzle of the extruder to obtain a strand.

Step (ii): Step in which the strand extruded from the nozzle of the extruder is conveyed by a belt cooler.

Step (iii): Step in which the strand is conveyed by the belt cooler, and water is sprayed toward the strand conveying direction using a spray nozzle device to solidify the strand.

Step (iv): Step in which the strand is conveyed by the belt cooler, and air is ejected toward the strand conveying direction using an air nozzle device to remove water adhering to the surface of the strand and to further cool the strand.

Step (v): Step in which the solidified strand is cut by a fixed blade and a rotary blade provided on a pelletizer while taking up the solidified strand using take-up rolls to obtain the pellet of a liquid crystal polyester resin composition.

Figure 2:
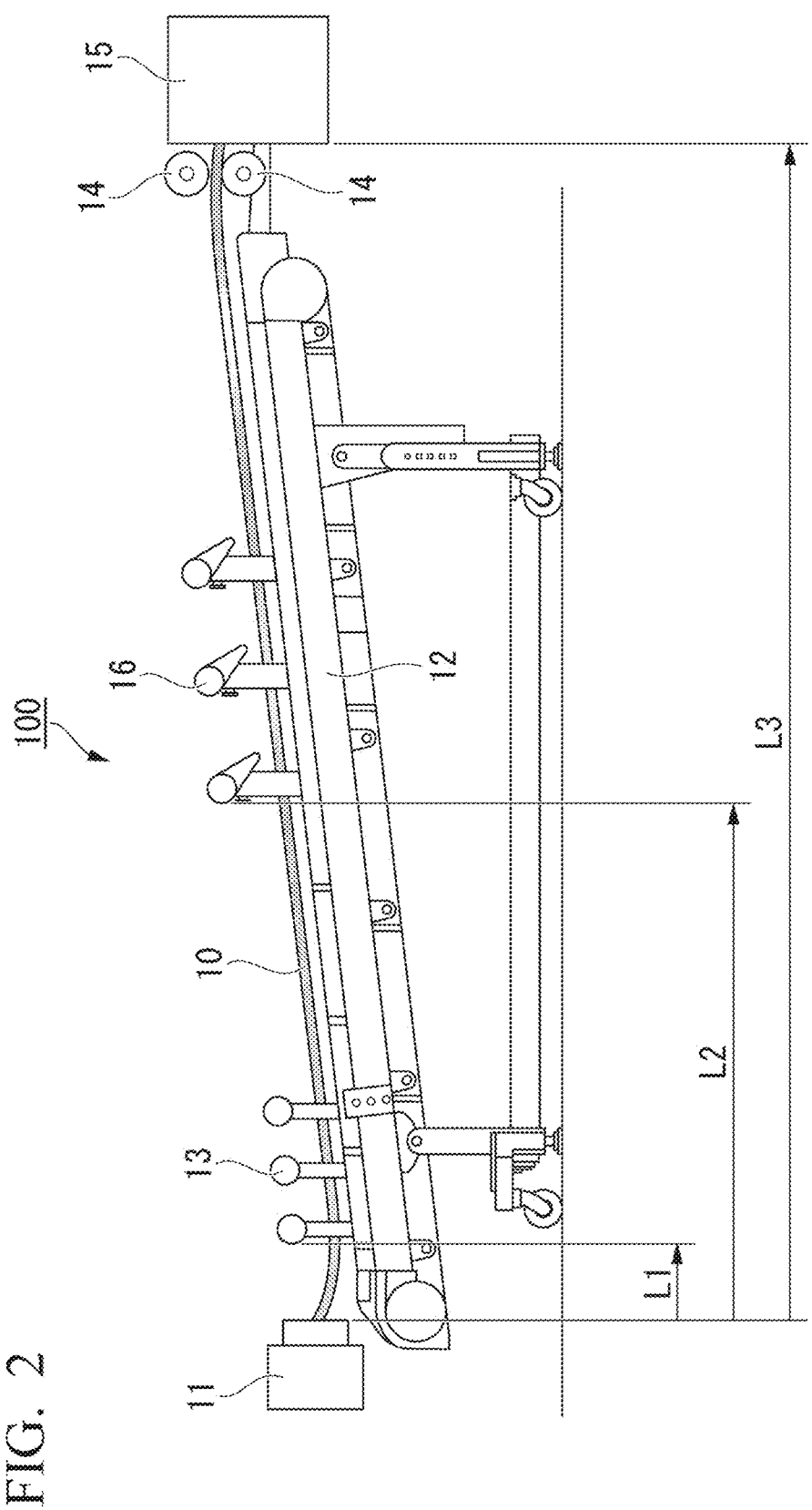
FIG. 2 is a schematic diagram indicating an aspect of manufacturing equipment available in a preparation method of a pellet according to the present embodiment.

FIG. 2 is schematic diagram showing one embodiment of the manufacturing equipment used in the preparation method of the pellet according to the present embodiment.

In the following explanation, the terms "upstream side" and "downstream side" may be used based on the strand conveying direction.

The manufacturing equipment 100 shown in FIG. 2 includes: an extruder 11 equipped with a nozzle; a belt cooler 12 disposed on the downstream side of the extruder 11; a spray nozzle device 13 disposed on the downstream side of the extruder 11 and the upstream side of the belt cooler 12; an air nozzle device 16 disposed on the downstream side of the spray nozzle device 13 and the upstream side of the belt cooler 12; a pair of take-up rolls 14 disposed on the downstream side of the air nozzle device 16, and at an end of the conveying direction of the belt cooler 12; and a pelletizer 15 disposed on the downstream side of the take-up rolls 14 and having both a fixed blade and a rotary blade.

Step (i):

In step (i), the liquid crystal polyester resin, the inorganic filler and other components used as needed are melt-kneaded by an extruder 11, and then the liquid crystal polyester resin composition is extruded in a melt state from a nozzle of the extruder 11 to obtain a strand 10 of the liquid crystal polyester resin composition. The strand 10 is conveyed on the belt cooler 12 from the upstream side to the downstream side.

The extruder 11 preferably includes: a cylinder; at least one screw disposed inside the cylinder; and at least one feed inlet disposed in the cylinder, and more preferably further includes at least one vent portion disposed in the cylinder. In addition, the cylinder preferably includes: a main feed inlet; and a side feed inlet provided on the downstream side in the extruding direction relative to the main feed inlet.

In the case where the cylinder has a vent portion, the vent portion may be an open vent type which is opened to the atmosphere, or a vacuum vent type which is connected to a water seal pump, a rotary pump, an oil diffusion pump, a turbo pump, or the like, to be held in a vacuum.

The melt-kneading temperature in the extruder 11 is determined depending on the flow initiation temperature of the liquid crystal polyester resin. The melt-kneading temperature is generally 20° C. to 40° C. higher than the flow initiation temperature of the liquid crystal polyester resin, and is generally within a range of 320° C. to 400° C. The melt-kneading temperature in the extruder 11 may be adjusted by the temperature of the cylinder in the extruder 11.

The diameter of the strand 10 extruded from the nozzle of the extruder 11 is generally 3 mm to 5 mm, and more preferably 3.5 mm to 5 mm. In the case where the diameter of the strand 10 is within the above-mentioned range, strand break due to the extreme thinness of the extruded strand 10 rarely occurs, and cooling can be sufficiently conducted in the conveying step, thereby allowing a pellet having a desired quality to be easily obtained.

Although the number of outlets of the nozzle of the extruder 11 is not particularly limited, and may be one or plural, the nozzle generally has 1 to 30 outlets. The diameter of the strand 10 and the number of exhausted strands may be adjusted by the size and the number of outlets of the nozzle of the extruder 11.

Step (ii):

In step (ii), the strand 10 extruded from the nozzle of the extruder 11 is conveyed by the belt cooler 12 front the upstream side to the pelletizer 15 located at the downstream side.

Although any conventionally-available conveyor may be used as the belt cooler 12, examples thereof include a mesh conveyor, a net conveyor, a belt conveyor, and a vibrating conveyor. Among these, a mesh conveyor and a net conveyor (only the name thereof may be different) are preferable, because water on the conveying surface can be removed easily and the amount of moisture adhering to the surface of the strand 10 can be reduced.

The material of the belt cooler 12 is preferably metal. As the material of the belt cooler 12, a material which is resistant to corrosion or rust due to water, such as an alloy containing stainless steel, titanium, zirconium, or the like, is preferably used.

The belt cooler 12 has a contact surface with the strand 10, the contact surface preferably having a metal mesh shape. The metal mesh shape not only improves the drainage on the conveying surface, but also suppresses disturbance of the strand 10 and improves the conveyability of the strand 10.

Although the mesh size or the type of the metal mesh is not particularly limited, the mesh size is preferably thicker than the thickness of the strand 10. The metal mesh may be made of woven metal wire or punched metal. The metal mesh made of woven metal wire is more preferable from the viewpoint of the favorable flexibility and excellent rotationability.

Although the velocity at which the belt cooler 12 conveys the strand 10 is not particularly limited within the range in which effects of the present embodiment are not impaired, the velocity is generally about 15 m/minute to 30 m/minute, and is preferably about the same degree as that of the taking-up velocity by the take-up rolls 14.

Although the installation angle of the belt cooler 12 is not particularly limited within the range in which effects of the present embodiment are not impaired, the installation angle is preferably 0° to 10°, and more preferably higher than 0° and 30 or less, in an upward direction relative to the conveying direction, from the viewpoint that the conveyability of the strand 10 is excellent and the flow of water removed from the strand 10 in the direction toward the pelletizer 15 can be suppressed. In addition, the sprayed water can be collected by making the installation angle higher than 0° in the upward direction.

Step (iii):

In step (iii), water was sprayed by a spray nozzle device 13 to the strand 10 which is extruded from the nozzle of the extruder 11 and is present on the belt cooler 12, thereby allowing water to adhere to the surface of the strand 10, as a result of which the strand 10 is solidified by being cooled due to heat exchange between the strand 10 and water and vaporization heat of water.

The spray nozzle device 13 is composed of pipes in which multiple holes are present at appropriate intervals in a line, and the multiple holes are disposed across the entire width of strand 10 extruded from the nozzle of extruder 11. The diameter of the pipe is usually 10 mm to 20 mm, and the diameter of the hole is preferably 1 mm to 5 mm.

Although the distance from the water spray position of the spray nozzle device 13 to the strand (spray surface) is not particularly limited, the distance is preferably within the range of 10 mm to 1000 mm, more preferably within the range of 50 mm to 500 mm, and even more preferably within the range of 100 mm to 250 mm.

It is preferable that the number of the spray nozzle devices 13 disposed at a constant interval be 1 to 10, and more preferably 2 to 4. In the case where plural spray nozzle devices 13 are disposed, the spray nozzle devices 13 may be disposed corresponding to each plural strand 10, or may be disposed per group formed by some strands 10. In any case, water spray cooling can be appropriately conducted depending on each strand 10 by making it possible to control the spray nozzle device 13 independently.

In the manufacturing equipment 100 shown in FIG. 2, three spray nozzle devices 13 are disposed.

Although "the distance (L1) between a point at which the strand 10 is discharged from the nozzle of the extruder 11 and a point at which the strand 10 contacts firstly with water sprayed from the spray nozzle device 13", that is, the distance (L1) between the nozzle of the extruder 11 and the spray nozzle device 13, is not particularly limited, the distance (L1) is preferably within a range of 10 mm to 300 mm, and more preferably 50 mm to 200 mm, from the viewpoint of the slippage suppressibility of the strand 10 on the belt cooler 12 and the fusion suppressibility between the strands 10.

In the case where the plural strands 10 are conveyed, it is preferable that water be sprayed such that the surface temperature of each strand 10 becomes uniform by adjusting the amount of sprayed water. The reason thereof is because there is a tendency in which homogeneous pellets cannot be obtained and strand break or defects or sink marks in the cross section of the pellets occur, when a significant difference is present in the surface temperature of each strand 10.

Water, pure water, ion-exchanged water, industrial water, cooling water circulating in a cooling tower, or the like, may be used as water to be sprayed from the spray nozzle device 13. The temperature of water sprayed from the spray nozzle device 13 is preferably room temperature (within a range of 15° C. to 23° C.). In the case where the temperature of water to be sprayed is adjusted, a combination of water having different temperatures within a range of 1° C. to 50° C. relative to room temperature may be used.

The spray nozzle device 13 has a mechanism configured to control the amount or temperature of water to be sprayed (water-cooling controlling mechanism). Examples of the mechanism configured to control the amount or temperature of water to be sprayed in the spray nozzle device 13 include conventionally-known valves configured to control the flow volume or the pressure of water flowed in a pipe which connects with the spray nozzle of the spray nozzle device 13.

The amount of water sprayed by the spray nozzle device 13 per unit time per strand is preferably within the range of 0.1 mL/minute to 50 mL/minute, and more preferably 1 mL/minute to 10 mL/minute.

An interval between the spray nozzle device 13 and the strand 10 is generally 10 mm to 200 mm. The spray angle of water by the spray nozzle device 13 is generally within a range of 15° to 165°, preferably 650 to 115°, when the vertical upward direction is defined as 0°. In addition, the position of the spray nozzle device 13 in the height direction is appropriately determined such that water sprayed at the above-mentioned wide angle sufficiently hits the strand 10.

Step (iv):

In step (iv), air is discharged to the strand 10 on the belt cooler 12 from the air nozzle device 16 to remove water adhering to the surface of the strand 10 and further cool the strand 10.

The air nozzle device 16 is a device fixed by bolts or the like at the position from which air is allowed to be discharged to the strand 10 on the belt cooler 12. The air nozzle device 16 is a device configured to remove water adhering to the strand 10 from the surface of the strand 10 and to cool the strand 10, and a conventionally-known air blow device or dryer device may be used.

The number of the air nozzle device 16 disposed at a constant interval is preferably 1 to 10, and more preferably 2 to 4. In the case where plural air nozzle devices 16 are disposed, the air nozzle devices 16 may be disposed corresponding to each of the plural strands 10, or may be disposed per group formed by some strands 10. In any case, the amount of air discharged from each device corresponding to each strand 10 can be controlled by making it possible to control the amount of air discharged from an outlet of the air nozzle device 16 independently.

Three air nozzle devices 16 are disposed in the manufacturing equipment 100 shown in FIG. 2.

"The distance (L2) from the nozzle of the extruder 11 to the air nozzle device" is preferably within a range of 1000 mm to 4000 mm, and more preferably 1200 mm to 3500 mm, such that the discharged air does not affect spraying of water.

In the case where plural strands 10 are conveyed, it is preferable that water adhering to the surface of the strand 10 be removed by discharging air such that the surface temperature of each strand 10 becomes further uniform by controlling the face to which air is discharged. The reason thereof is because there is a tendency in which homogeneous pellets cannot be obtained and strand break, defect in the cross section of the pellets, or generation of chips occurs, when a significant difference is present in the surface temperature of each strand 10.

The discharged air may be air or atmosphere in the presence of an inert gas such as nitrogen or argon. Air is preferable from the viewpoint of the productivity.

A conventionally-known air nozzle device having an air volume control mechanism or a temperature control mechanism in which a heater or a cooler is installed to change the air volume or the air temperature of the discharged air may be used as the air nozzle device 16.

Although the wind velocity or volume of air discharged from the air nozzle device 16 is not particularly limited, provided that the temperature of the strand 10 can be controlled within the predetermined range and water adhering to the surface of the strand 10 can be removed, a wind velocity or volume of air that does not allow meandering of the strand 10 on the belt cooler 12 is preferable.

The volume of air discharged from the air nozzle device 16 per unit time per strand is preferably within a range of 0.1 L/second to 5 L/second, and more preferably 0.3 L/second to 1.5 L/second. Although the temperature of air discharged from the air nozzle device 16 is not particularly limited, provided that the temperature of the strand 10 can be controlled within the predetermined range and water adhering to the surface of the strand 10 can be removed, the temperature is preferably within a range of (room temperature −30° C.) to (room temperature +30° C.), and more preferably (room temperature −15° C.) to (room temperature +15° C.).

Although the angle of air-discharge to remove water adhering the surface of the strand 10 is not particularly limited, a device which allows air-discharge from the upward side to the downward side is preferable. In the case where plural air nozzle devices 16 are disposed in the width direction of the belt cooler 12, the air nozzle devices 16 may be disposed corresponding to each plural strand 10, or may be disposed corresponding to each group formed by some strands 10.

Step (v):

In step (v), the solidified strands 10 are cut by a fixed blade and a rotary blade provided on a pelletizer 15 while taking-up the solidified strands 10 by take-up rolls 14 to obtain pellets of the liquid crystal polyester resin composition.

The pelletizer 15 cuts the strand 10 by a fixed blade and a rotary blade, that is, the strand 10 is cut into a predetermined length by being sandwiched between the fixed blade and the rotary blade, thereby forming pellets.

A fixed blade and a rotary blade provided on a conventionally-known pelletizer may be appropriately used as the fixed blade and the rotary blade. The number of blades provided on the rotary blade is not particularly limited, provided that plural blades are provided. Namely, the number may be the same as that of the blade provided on a rotary blade of a conventionally-known strand cutter.

Although the material of the blade provided on the fixed blade and the rotary blade is not particularly limited, examples thereof include WC—Co-based alloys. TiN—Ni-based alloys, and TiC—Ni-based alloys.

It is preferable that the pelletizer 15 be disposed to be inclined from the direction vertical to the conveying direction of the strand 10 on the belt cooler 12.

Figure 3:
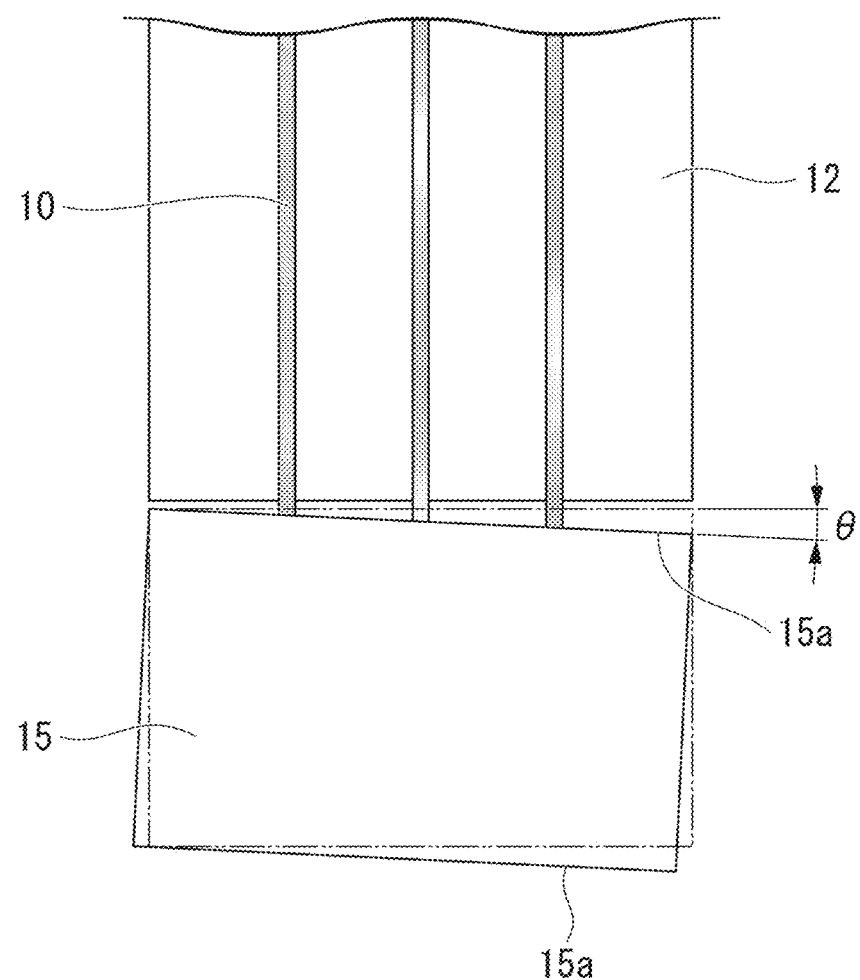
FIG. 3 is a drawing illustrating an installation angle of a pelletizer.

FIG. 3 is a drawing illustrating an installation angle of the pelletizer 15.

In an embodiment shown in FIG. 3, the installation angle of the pelletizer 15 refers to an angle determined by the direction vertical to the conveying direction of the strand 10 on the belt cooler 12 and a long side 15a of an approximate rectangle viewed in the plane of the pelletizer 15.

It is preferable that the long side 15a of an approximate rectangle viewed in the plane of the pelletizer 15 be parallel to the direction of an axis of rotation of the rotary blade provided on the pelletizer 15.

For example, the installation angle of the pelletizer 15 from the direction vertical to the conveying direction of the strand 10 on the belt cooler 12 is preferably within a range of 1° to 5°, and more preferably more than 1° and 4° or less. In the case where the installation angle is within the above-mentioned range, the area ratio S/S0 of the pellet can be easily controlled without deteriorating the conveyability of the strand 10.

"The distance (L3) from the nozzle of the extruder 11 to the pelletizer 15" is preferably within a range of 500 mm to 6000 nm, and more preferably 800 mm to 4000 mm. In the case where the distance L3 is within the above-mentioned range, the temperature of the strand 10 is easily stabilized, and a space in which problems generated when the strand 10 is conveyed or the like can be dealt with (working space in which the strand 10 is inserted into a cutter at start-up or when the strand breaks) can be ensured.

In the preparation method of the pellet according to the present embodiment, the taking-up velocity of the take-up rolls 14 and the rotational speed of the rotary blade are controlled such that the length of the pellet is 3 mm to 4 mm, based on the relationship between the length of the pellet, the taking-up velocity of the take-up rolls 14, and the rotational speed of the rotary blade.

The slower the taking-up velocity of the take-up rolls 14, the larger the size of the pellet in a radial direction, and the closer to 1 the length ratio D1/D2 of the major axis D1 to the minor axis D2 in the cross-section of the pellet. The faster the rotational speed of the rotary blade, the shorter the length of the pellet, and the closer to 1 the length ratio D1/D2 of the major axis D1 to the minor axis D2 in the cross-section of the pellet.

The faster the taking-up velocity of the take-up rolls 14, the longer the strand 10 extends in the conveying direction. Thus, both the major axis D1 and the minor axis D2 in the cross-section of the pellet tend to be short.

In the preparation method of the pellet according to the present embodiment, the taking-up velocity of the take-up rolls 14 and the rotational speed of the rotary blade are controlled such that the area ratio S/S0 of the pellet is 0.55 to 0.70, based on the relationship between the area ratio S/S0 of the pellet, the taking-up velocity of the take-up rolls 14 and the rotational speed of the rotary blade.

There is a tendency in which the slower the taking-up velocity of the take-up rolls 14, the larger the axes D1 and S2 of the strand 10, the easier the strand 10 is cooled, and the easier the strand 10 is solidified. Accordingly, it is difficult for the pellet to be deformed by cutting by the pelletizers 15. Thus, the area ratio S/S0 of the pellet is increased.

The faster the velocities of the take-up rolls 14 and the rotary blade, the easier the pellet is transformed when the pellet is cut. Accordingly, the area ratio S/S0 of the pellet becomes small.

In the preparation method of the pellet according to the present embodiment, the pressure of the take-up rolls 14 and the rotational speed of the rotary blade are controlled such that the length ratio D1/D2 of the pellet is more than 1.0 and 2.5 or less, based on the relationship between the length ratio D1/D2 of the pellet, the taking-up velocity of the take-up rolls 14 and the rotational speed of the rotary blade.

The higher the pressure of the take-up rolls 14, the easier the strand 10 is extended in a horizontal direction. In the case where such a strand 10 is cut by the pelletizer 15, the major axis D1 in the cross-section of the pellet tends to be increased, and the minor axis D2 tends to be decreased. Thus, the length ratio D1/D2 of the pellet is increased.

There is a tendency in which the faster the rotational speed of the rotary blade, the longer the major axis D1 in the cross-section of the pellet and the shorter the minor axis D2 when the pellet is cut. Accordingly, the length ratio D1/D2 in the pellet is increased.

The preparation method of the pellet according to the present embodiment may further include a step in which fine powders generated from the pellet are removed by mixing the pellet obtained in step (v) by a tumbler mixer to control the area ratio S/S0 in the pellet.

The method of removing fine powders is not particularly limited, and a conventionally-known method may be adopted. In the removing step, the rotational speed of the tumbler mixer is controlled such that the area ratio S/S0 in the pellet is 0.55 to 0.70 based on the relationship between the area ratio S/S0 in the pellet and the rotational speed of the tumbler mixer. There is a tendency in which the faster the rotational speed of the tumbler mixer, the easier the collision between pellets, and the easier fine powders are generated due to the defect of the pellet. Thus, the area ratio S/S0 in the pellet is decreased.

The preparation method of the pellet of the above-mentioned embodiment makes it possible to obtain pellets in which the generation of fine powders caused by cracking of the pellet is suppressed.

In addition, the pellet obtained by the preparation method of the pellet according to the embodiment has a cylindrical shape, and the cross-section in a radial direction of the pellet has an elliptical shape.

<Molded Article>

The above-mentioned pellet of the liquid crystal polyester resin composition is used as a forming material of a molded article according to the present embodiment.

Examples of products and components that are molded articles formed from the pellet of the liquid crystal polyester resin composition include: bobbins such as optical pickup bobbins and transformer bobbins; relay components such as relay cases, relay bases, relay sprues and relay armatures; connectors such as RIMM connectors, DDR connectors, CPU sockets, S/O connectors, DIMM connectors, board-to-board connectors, FPC connectors, card connectors, and coaxial connectors; reflectors such as lamp reflectors and LED reflectors; holders such as lamp holders and heater holders; diaphragms such as speaker diaphragms; separation claws such as separation claws of copiers and separation claws of printers camera module components; switch components; motor components; sensor components; hard disk drive components; tableware such as ovenware; vehicle components; aircraft components; and sealing members such as semiconductor element sealing members and coil sealing members.

As a molding method of the pellet of the liquid crystal polyester resin composition, a melt molding method is preferable, and examples thereof include: injection molding methods; extrusion molding methods such as T-die methods and inflation methods; compression molding methods; blow molding methods; vacuum molding methods; and press molding methods. Among these, injection molding methods are preferable.

EXAMPLES

Hereinafter, the present invention will be explained by way of examples. However, the present invention is not limited to the examples. The measurements were performed as indicated below.

<Measurement of Flow Initiation Temperature of the Liquid Crystal Polyester Resin>

Using a flow tester (manufactured by Shimadzu Corp., under the model number of "Model mm-500EX"), about 2 g of a pellet of a liquid crystal polyester resin was loaded into a cylinder equipped with a die having a nozzle having an inner diameter of 1 mm and a length of 10 mm, the pellet of the liquid crystal polyester resin was melted and extruded from the nozzle under a load of 9.8 MPa while raising the temperature at a rate of 4° C./minute, and the temperature at which the viscosity thereof reached 4800 Pa·s was measured as the flow initiation temperature.

<Measurement of the Length of the Pellet, the Major Axis D1 and the Minor Axis D2 in the Cross-Section of the Pellet, and the Area S of the Projected Image of the Pellet and the Area S0 of the Rectangle Circumscribed Around the Projected Image of the Pellet>

100 pellets were recorded using a device manufactured by KEYENCE CORPORATION under the trade name of "VR-3200 one-shot 3D shape measurement device", and each size of the pellets was determined by conducting analysis based on the resultant image.

Specifically, at least 100 pellets were placed on a flat plate. At the time, each pellet was placed by arranging the axial direction of the whole pellets in one direction parallel to the plane direction of the flat plate on which the pellets were placed, in view of the restriction on the measurement by the device. Furthermore, the pellets were placed such that the pellets having a cylindrical shape took the most stable position in a field of view from the axial direction of the pellets. In the case where the shape of the cross-section in a radial direction of the pellet was close to an elliptical shape, each pellet was fixed using a double-coated tape such that the long axis of the elliptical shape was parallel to the plane direction of the flat plate on which the pellets were placed.

The projected image (front projected image) of each arranged pellet was recorded from above the direction vertical to the plane direction of the flat plate on which the pellets were placed using the above-mentioned device in accordance with the usual method of using the device.

The vertical Feret length and the horizontal Feret length of each pellet was measured using the recorded front projected image of the pellet. Specifically, the analysis was conducted per pellet using an attached analysis software, and a rectangle circumscribed around the resultant projected image was set, the length of the long side of the rectangle was defined as the horizontal Feret length, and the length of the short side of the rectangle was defined as the vertical Feret length.

The rectangle circumscribed around the front projected image of the pellet was set such that a portion of the front projected image was inscribed to all of four sides of the rectangle, and the area of the rectangle was minimized.

The length of the long side of the rectangle (horizontal Feret length) was defined as the length of the pellet.

The length of the short side of the rectangle (vertical Feret length) was defined as the major axis D1 of the cross-section of the pellet.

The maximum height in the cross-section of the pellet was defined as the minor axis D2 of the cross-section of the pellet. The term "maximum height" means the maximum value of the height from the flat plate. The average of the maximum height of the cross-section of the pellet was defined as the average height of the pellet.

The product of the vertical Feret length and the horizontal Feret length was defined as the area S0 of the rectangle circumscribed around the front projected image of the pellet. The actual cross-sectional area of the cross-section at a half height of the average height of the pellets, the cross-section being horizontal to the plane direction of the flat plate in which the pellets were placed, was calculated using the attached analysis software, and the cross-sectional area was defined as the area S of the projected image of the pellet.

<Measurement of the Compressive Strength of the Pellet>

At first, one pellet was placed on a flat plate of a precision strength measurement device such that the direction of the length of the pellet became vertical to the flat plate. Then, the compressive strength was measured by loading the pressure in a direction of the minor axis in the cross-section by making a plate having a head thickness of 1 mm pass from the top surface of a cylindrical sample through the vicinity of the central portion of the top surface of the cylindrical sample, thereby measuring the strength at which the pellet was broken. The resultant strength was divided by the minor axis D2 of the measured cross-section of the pellet to determine the compressive strength of the pellet according to the present embodiment in the unit of N/mm. The measurement was conducted five times, and the average of the resultant values was adopted. In the case where it was difficult to place the pellet on the flat plate as mentioned above, the pellet was treated to planarize the cross-section of the pellet before placing the pellet on the flat plate.

<Measurement of the Amount of Fine Powders Generated from the Pellet>

About 1 kg of the pellet was passed through a sieve having a mesh size of 1 mm to remove fine powders from the pellet, and then the weight of the whole pellet from which the fine powders were removed was measured. Then, the whole pellet from which the fine powders were removed was treated at a rotational speed of 30 rpm/minute using a tumbler manufactured by PLAENG under the model number of SKD-25 for 20 minutes and then the whole pellet was collected together with the generated fine powders. Then, the fine powders generated from the pellet treated with the tumbler were separated therefrom using a sieve having a mesh size of 1 mm, followed by measuring the weight of the fine powders. The amount (ppm) of generated fine powders was calculated from the weight of the whole pellet before being treated with the tumbler and the weight of generated fine powders.

<Preparation of Liquid Crystal Polyester Resin>

Preparation Example 1 (Liquid Crystal Polyester Resin A)

994.5 g (7.2 mol) of p-hydroxybenzoic acid, 446.9 g (2.4 mol) of 4,4'-dihydroxybiphenyl, 299.0 g (1.8 mol) of terephthalic acid, 99.7 g (0.6 mol) of isophthalic acid and 1347.6 g (13.2 mol) of acetic anhydride were put in a reactor equipped with a stirrer, a torque meter, a nitrogen gas inlet tube, a thermometer and a reflux condenser, and the atmosphere in the reactor was replaced with a nitrogen gas, followed by adding 0.18 g of 1-methylimidazole thereto, raising the temperature thereof from room temperature to 150° C. over 30 minutes while stirring the mixture under a nitrogen gas stream, and then conducting refluxing at 150° C. for 30 minutes.

Then, 2.4 g of 1-methylimidazole was added to the result, and the temperature thereof was raised from 150° C. to 320° C. over 2 hours 50 minutes while distilling off by-product acetic acid and unreacted acetic anhydride, followed by removing the resultant content from the reactor when an increase in torque was observed, and then conducting cooling to room temperature, thereby obtaining a solid prepolymer.

Then, the prepolymer was pulverized using a pulverizer, and the temperature of the resultant pulverized product was raised under a nitrogen atmosphere from room temperature to 250° C. over 1 hour, and then further raised from 250° C. to 295° C. over 5 hours, followed by maintaining the temperature at 295° C. for 3 hours to allow the solid phase polymerization to proceed. The resultant solid phase polymer was cooled to room temperature to obtain powdery liquid crystal polyester A. The flow initiation temperature of the resultant liquid crystal polyester A was 327° C.

Preparation Example 2 (Liquid Crystal Polyester Resin B)

994.5 g (7.2 mol) of p-hydroxybenzoic acid, 446.9 g (2.4 mol) of 4,4'-dihydroxybiphenyl, 239.2 g (1.44 mol) of terephthalic acid, 159.5 g (0.96 mol) of isophthalic acid and 1347.6 g (13.2 mol) of acetic anhydride were put in a reactor equipped with a stirrer, a torque meter, a nitrogen gas inlet tube, a thermometer and a reflux condenser, and the atmosphere in the reactor was replaced with a nitrogen gas, followed by adding 0.18 g of 1-methylimidazole thereto, raising the temperature thereof from room temperature to 150° C. over 30 minutes while stirring the mixture under a nitrogen gas stream, and then conducting refluxing at 150° C. for 30 minutes.

Then, 2.4 g of 1-methylimidazole was added to the result, and the temperature thereof was raised from 150° C. to 320° C. over 2 hours 50 minutes while distilling off by-product acetic acid and unreacted acetic anhydride, followed by removing the resultant content from the reactor when an increase in torque was observed, and then conducting cooling to room temperature, thereby obtaining a solid prepolymer.

Then, the prepolymer was pulverized using a pulverizer, and the temperature of the resultant pulverized product was raised under a nitrogen atmosphere from room temperature to 220° C. over 1 hour, and then further raised from 220° C. to 240° C. over 30 minutes, followed by maintaining the temperature at 240° C. for 10 hours to allow the solid phase polymerization to proceed. The resultant solid phase polymer was cooled to room temperature to obtain powdery liquid crystal polyester B. The flow initiation temperature of the resultant liquid crystal polyester B was 286° C.

In the following examples, the following commercially-available products were used as a resin other than the liquid crystal polyester resin, an inorganic filler, or a mold release agent.

Resin other than the liquid crystal polyester resin: Polybutylene terephthalate 1100S (manufactured by TORAY INDUSTRIES, INC.) was immersed in liquid nitrogen, and then pulverized using a sample mill (manufactured by Kyoritsu Riko Co., Ltd., under the model number of SK-M), followed by sieving to sort particles of 42-mesh pass (passing through a sieve having a mesh size of 350 µm) and 80-mesh on, thereby obtaining particles having an average particle size of 300 µm.

Inorganic filler: mica, AB-25S, manufactured by YAMAGUCHI MICA CO., LTD., in which the volume-average particle size is 24 µm, and the thickness is 0.45 µm.

Inorganic filler: Chopped glass fiber. CS3J-260S, manufactured by Nitto Boseki Co., Ltd.

Mold release agent: LOXIOL VPG 861, manufactured by Emery Oleochemicals Japan, (a mixture of full ester and partial ester of pentaerythritol and stearic acid (tetrastearate), in which the 5% weight loss temperature is 310° C.).

<Preparation of Pellet>

Examples 1 to 4 and Comparative Examples 1 to 4

Each pellet was prepared using manufacturing equipment having the same configuration as that of the manufacturing equipment shown in FIG. 2.

Nozzles were disposed at the tip of a twin screw extruder (manufactured by Ikegai Corp., under the model number of "PCM-30HS") such that three strands were extruded therefrom. Then, a belt cooler (manufactured by ISUZU KAKOHKI CO., LTD., under the model number of "SWS-200-3") configured to convey the strands extruded from the nozzles, the contact surface of the belt cooler with the strands being a stainless steel mesh, was disposed in the twin screw extruder. Spray nozzle devices configured to cool the strands conveyed by the belt cooler, the number of the spray nozzle devices being shown in Table 1 or 2, were arranged above the conveying surface of the belt cooler from a point having a predetermined distance (L1) from the nozzles disposed at the tip of the twin screw extruder at a constant interval along the conveying direction of the belt cooler at a height of 170 mm from the belt cooler. Then, air nozzle devices, the number of which is shown in Table 1 or 2, were arranged from a point having a predetermined distance (L2) from the nozzles disposed at the tip of the twin screw extruder at a constant interval along the conveying direction of the belt cooler at a height of 100 mm from the belt cooler. Furthermore, a pelletizer (manufactured by ISUZU KAKOHKI CO., LTD., under the model number of "PS200", and having 24 rotary blades) configured to pelletize the strands conveyed by the belt cooler was placed adjacent to the belt cooler such that the installation angle relative to the belt cooler was obtained as shown in Table 1 or 2.

The installation angle of the pelletizer was defined as an angle determined by the direction vertical to the direction of conveying the strands on the belt cooler and the direction of an axis of rotation of the rotary blade provided on the pelletizer.

Preparation of the Pellet in Examples 1 to 4 and Comparative Examples 1 to 3

The liquid crystal polyester resin, the inorganic filler and the mold release agent were melt-kneaded at a ratio shown in Table 1 or 2 at a cylinder temperature of 360° C. (380° C. in Example 4) while expelling air from a vacuum vent provided on the twin screw extruder using a water seal type vacuum pump (manufactured by Shinko Seiki Co., Ltd., under the model number of "SW-25"), and extruded from the nozzles to obtain strands of the liquid crystal polyester resin composition (step (i)).

The resultant strands were conveyed on the belt cooler towards the downstream side (step (ii)).

Then, water was discharged onto the strands on the belt cooler from the spray nozzle devices to make water contact with the strands, thereby cooling the strands (step (iii)).

Then, air was discharged onto the strands on the belt cooler from the air nozzle devices to further solidify the strands (step (iv)).

Then, the solidified strands were cut by a fixed blade and a rotary blade provided on the pelletizer while taking up at a rotational speed of 25 m/minute by take-up rolls, thereby obtaining pellets (step (v)).

The resultant pellets were mixed for 20 minutes at a rotational speed of 30 rpm/minute using a tumbler mixer (manufactured by PLAENG under the model number of "SKD-25") to remove fine powders generated from the pellets.

Preparation of the Pellet in Comparative Example 4

Polybutylene terephthalate, the inorganic filler and the mold release agent were melt-kneaded at a ratio shown in Table 2 at a cylinder temperature of 250° C. while expelling air from a vacuum vent provided on the twin screw extruder using a water seal type vacuum pump (manufactured by Shinko Seiki Co., Ltd., under the model number of "SW-25"), and extruded from the nozzles to obtain strands of the resin composition (step (i)).

Then, steps (ii) to (v) were conducted by the same way as that of Example 1 to obtain pellets. The resultant pellets were mixed for 20 minutes at a rotational speed of 30 rpm/minute using a tumbler mixer (manufactured by PLAENG under the model number of "SKD-25") to remove fine powders generated from the pellets.

The formulation ratio of the resin, the inorganic filler and the mold release agent; the cylinder temperature when the pellet was prepared; the distance (L1) between the nozzle provided at the tip of the twin screw extruder and the spray nozzle device; the number of spray nozzle devices; the distance (L2) between the nozzle provided at the tip of the twin screw extruder and the air nozzle device: the number of air nozzle devices; and the installation angle of the pelletizer are shown in Tables 1 and 2. The unit of the formulation ratio of the resin, the inorganic filler and the mold release agent is "parts by mass".

TABLE 1

| | | Example 1 | Example 2 | Example 3 | Example 4 |
|---|---|---|---|---|---|
| Resin | Liquid crystal polyester A (parts by mass) | 35.8 | 35.8 | 35.8 | 35.8 |
| | Liquid crystal polyester B (parts by mass) | 29.3 | 29.3 | 29.3 | 29.3 |
| Inorganic filler | Mica (parts by mass) | 35.0 | 35.0 | 35.0 | 35.0 |
| Mold release agent | VPG861 (parts by mass) | 0.3 | 0.3 | 0.3 | 0.3 |
| Cylinder temperature (° C.) | | 360 | 360 | 360 | 380 |
| Spray nozzle device | Distance L1 from nozzle of extruder (mm) | 120 | 120 | 140 | 140 |
| | Number of devices | 4 | 3 | 2 | 4 |
| Air nozzle device | Distance L2 from nozzle of extruder (mm) | 1500 | 1500 | 1700 | 1700 |
| | Number of devices | 3 | 3 | 2 | 3 |
| Pelletizer | Installation angle (°) | 2 | 3 | 1 | 4 |

TABLE 2

| | | Comparative Example 1 | Comparative Example 2 | Comparative Example 3 | Comparative Example 4 |
|---|---|---|---|---|---|
| Resin | Liquid crystal polyester A (parts by mass) | 35.8 | 35.8 | 35.8 | — |
| | Liquid crystal polyester B (parts by mass) | 29.3 | 29.3 | 2.9.3 | — |
| | Polybutylene terephthalate (parts by mass) | — | — | — | 70.0 |
| Inorganic filler | Mica (parts by mass) | 35.0 | 35.0 | 35.0 | — |
| | Glass fiber (parts by mass) | — | — | — | 30.0 |

TABLE 2-continued

|  |  | Comparative Example 1 | Comparative Example 2 | Comparative Example 3 | Comparative Example 4 |
|---|---|---|---|---|---|
| Mold release agent | VPG861 (parts by mass) | 0.3 | 0.3 | 0.3 | 0.3 |
| Cylinder temperature (° C.) | | 360 | 360 | 360 | 250 |
| Spray nozzle device | Distance L1 from nozzle of extruder (mm) | 120 | 120 | 140 | 120 |
| | Number of devices | 3 | 2 | 3 | 3 |
| Air nozzle device | Distance L2 from nozzle of extruder (mm) | 1500 | 1500 | 1700 | 1500 |
| | Number of devices | 3 | 3 | 3 | 3 |
| Pelletizer | Installation angle (°) | 0 | 0 | 0 | 3 |

The shape of the pellets, the compressive strength of the pellet, and the amount of line powders generated from the pellets in Examples 1 to 4 and Comparative Examples 1 to 4 are shown in Tables 3 and 4.

Each average of values obtained by measuring 100 pellets is indicated as the length, major axis DL, minor axis D2, length ratio D1/D22 and area ratio S/S0 in the shape of the pellets.

TABLE 3

|  |  | Example 1 | Example 2 | Example 3 | Example 4 |
|---|---|---|---|---|---|
| Shape of pellet | Length (μm) | 3403 | 3487 | 3122 | 3283 |
| | Major axis D1 (μm) | 3173 | 3158 | 2873 | 2909 |
| | Minor axis D2 (μm) | 1422 | 1413 | 1568 | 1547 |
| | Length ratio D1/D2 | 2.23 | 2.24 | 1.83 | 1.88 |
| | Area ratio S/S0 | 0.65 | 0.64 | 0.68 | 0.56 |
| Compressive strength of pellet (N/mm) | | 95 | 97 | 96 | 95 |
| Amount of fine powders generated from pellets (ppm) | | 120 | 270 | 450 | 330 |

TABLE 4

|  |  | Comparative Example 1 | Comparative Example 2 | Comparative Example 3 | Comparative Example 4 |
|---|---|---|---|---|---|
| Shape of pellet | Length (μm) | 2983 | 3476 | 3821 | 3354 |
| | Major axis D1 (μm) | 2760 | 3021 | 3262 | 2906 |
| | Minor axis D2 (μm) | 1372 | 1913 | 1763 | 1330 |
| | Length ratio D1/D2 | 2.01 | 1.58 | 1.85 | 2.19 |
| | Area ratio S/S0 | 0.81 | 0.79 | 0.74 | 0.85 |
| Compressive strength of pellet (N/mm) | | 86 | 90 | 97 | 112 |
| Amount of fine powders generated from pellets (ppm) | | 710 | 2730 | 2020 | 110 |

The pellets in Examples 1 to 4 according to the present invention exhibited high compressive strength, and the amount of fine powders generated therefrom was low, as shown in Tables 3 and 4.

It is considered that since the area ratio S/S0 of the projected image of the pellets in Examples 1 to 4 was 0.55 or more, the generation of fine powders caused by friction between pellets was suppressed, thereby obtaining the above-mentioned results.

In addition, it is considered that since the area ratio S/S0 of the projected image of the pellets in Examples 1 to 4 was 0.70 or less, the orientation unique to the liquid crystal polyester resin was suppressed, thereby suppressing cracking along the orientation direction of the liquid crystal polyester resin in the pellet and thus obtaining the above-mentioned results.

In contrast, it was apparent that in Comparative Examples 1 to 3, in which the constitution of the pellets was the same as that of Examples 1 to 4, but the area ratio S/S0 of the projected image of the pellets was outside the range defined in the present invention, the amount of fine powders generated from the pellets was significantly larger than that of the pellets in Examples 1 to 4 according to the present invention, thereby causing a problem in terms of the generation of fine powders.

However, it was confirmed that in Comparative Example 4 in which the resin other than the liquid crystal polyester resin was used and the area ratio S/S0 of the projected image was outside the range defined in the present invention, the amount of fine powders generated from the pellets was lower than that from the pellet in Example 1. It is considered that since the compressive strength of the pellets in Comparative Example 4 was high, the pellets were hardly cracked, thereby making it difficult to generate fine powders.

It is considered in view of the above that the generation of fine powders caused by cracking of the pellets in Examples 1 to 4 was suppressed. Namely, in the pellet containing the liquid crystal polyester resin, a critical significance was confirmed in the area ratio S/S0 of the projected image of the pellet of 0.55 to 0.70.

It was confirmed from the above-shown results that the present invention is useful.

EXPLANATION OF REFERENCE NUMERALS 10 strand
11 extruder
12 belt cooler
13 spray nozzle device
14 take-up roll
15 pelletizer
16 air nozzle device
20 pellet
100 manufacturing equipment

The invention claimed is:

1. A pellet of a liquid crystal polyester resin composition, comprising: a liquid crystal polyester resin; and an inorganic filler, wherein:
the pellet having a cylindrical shape is placed on a plane, and a front projected image of the pellet is taken from a direction perpendicular to an axial direction of the pellet and from a direction perpendicular to the plane on which the pellet is placed,
a horizontal Feret length of a rectangle circumscribed around the front projected image of the pellet is taken as a length of a long side of the rectangle, and a vertical Feret length thereof is taken as a length of a short side of the rectangle,
the pellet has a maximum height in each cross section perpendicular to the plane, and an average of the maximum height of the each cross section is defined as an average height of the pellet,
a product of the vertical Feret length and the horizontal Feret length is defined as an area S0 of the rectangle circumscribed around the front projected image of the pellet,
a cross-sectional area of a cross-section at a half height of the average height of the pellet, the cross-section being horizontal to the plane, is defined as an area S of a projected image of the pellet,
the length of the long side of the rectangle is 3 mm to 4 mm, and
an area ratio S/S0 of the area S of the projected image to the area S0 of the rectangle is 0.55 to 0.70.

2. The pellet of a liquid crystal polyester resin composition according to claim 1, wherein
a direction of the length of the short side of the rectangle is defined as a radial direction of the pellet, a cross-section in the radial direction of the pellet has an elliptical shape, and
a length ratio D1/D2 of a major axis D1 to a minor axis D2 in the cross-section is more than 1.0 and 2.5 or less.

3. The pellet of a liquid crystal polyester resin composition according to claim 1, wherein the inorganic filler is at least one selected from the group consisting of chopped glass fiber, milled glass fiber, talc and mica.

4. The pellet of a liquid crystal polyester resin composition according to claim 1, wherein
the inorganic filler is mica, and
an amount of the mica relative to 100 parts by mass of the liquid crystal polyester resin is more than 20% by mass and 80% by mass or less.

5. The pellet of a liquid crystal polyester resin composition according to claim 2, wherein the inorganic filler is at least one selected from the group consisting of chopped glass fiber, milled glass fiber, talc and mica.

* * * * *